US012645379B2

(12) United States Patent
Jung et al.

(10) Patent No.: US 12,645,379 B2
(45) Date of Patent: Jun. 2, 2026

(54) STORAGE SYSTEM AND METHOD OF CONTROLLING OPERATION OF THE SAME

(71) Applicant: SAMSUNG ELECTRONICS CO., LTD., Suwon-si (KR)

(72) Inventors: Byungsue Jung, Suwon-si (KR); Jaeik Lee, Suwon-si (KR); Kyungduk Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 413 days.

(21) Appl. No.: 18/205,742

(22) Filed: Jun. 5, 2023

(65) Prior Publication Data

US 2024/0168666 A1 May 23, 2024

(30) Foreign Application Priority Data

Nov. 22, 2022 (KR) ......................... 10-2022-0157548

(51) Int. Cl.
*G06F 12/08* (2016.01)
*G06F 3/06* (2006.01)
*G06F 12/0808* (2016.01)
*G06F 12/0815* (2016.01)

(52) U.S. Cl.
CPC .......... *G06F 3/0634* (2013.01); *G06F 3/0605* (2013.01); *G06F 3/0673* (2013.01)

(58) Field of Classification Search
CPC ....... G06F 3/061; G06F 3/0659; G06F 3/0673
USPC ....................................................... 711/154
See application file for complete search history.

(56) References Cited

U.S. PATENT DOCUMENTS

| | | | |
|---|---|---|---|
| 7,852,774 B2 | 12/2010 | Shen et al. | |
| 8,001,470 B1 * | 8/2011 | Chen ........................ | G06F 9/453 |
| | | | 715/708 |
| 8,539,140 B2 * | 9/2013 | Fujimoto ................ | G06F 3/061 |
| | | | 711/170 |
| 8,612,776 B2 * | 12/2013 | Hakamata ............. | G06F 21/805 |
| | | | 713/193 |
| 8,683,152 B2 * | 3/2014 | Kulkarni ............... | G06F 3/0647 |
| | | | 711/E12.103 |
| 9,208,121 B2 | 12/2015 | Iyer et al. | |
| 9,280,507 B2 | 3/2016 | Iyer et al. | |
| 9,355,058 B2 | 5/2016 | Iyer et al. | |
| 9,378,171 B2 | 6/2016 | Iyer et al. | |
| 9,418,035 B2 | 8/2016 | Iyer et al. | |
| 9,444,492 B2 | 9/2016 | Willey et al. | |
| 9,479,196 B2 | 10/2016 | Willey et al. | |

(Continued)

FOREIGN PATENT DOCUMENTS

KR 10-1695340 B1 1/2017

*Primary Examiner* — Mohamed M Gebril
(74) *Attorney, Agent, or Firm* — Muir Patent Law, PLLC

(57) ABSTRACT

A method of controlling operation of a storage system including a storage device and a host device configured to control the storage device comprising determining, by a host device, a selected operation mode from among a plurality of operation modes of a storage device, notifying, by the host device, the selected operation mode to the storage device, setting, by the storage device, an operation condition of the storage device to a selected operation condition corresponding to the selected operation mode, and performing, by the storage device, an input-output operation with the host device based on the selected operation condition.

19 Claims, 19 Drawing Sheets

(56) References Cited

U.S. PATENT DOCUMENTS

| | | | |
|---|---|---|---|
| 9,507,746 B2 | 11/2016 | Willey et al. | |
| 9,600,431 B2 | 3/2017 | Iyer et al. | |
| 9,612,986 B2 | 4/2017 | Iyer et al. | |
| 9,626,321 B2 | 4/2017 | Safranek et al. | |
| 9,697,158 B2 | 7/2017 | Iyer et al. | |
| 9,740,654 B2 | 8/2017 | Willey et al. | |
| 9,753,885 B2 | 9/2017 | Willey et al. | |
| 9,836,540 B2 | 12/2017 | Mosko | |
| 9,892,086 B2 | 2/2018 | Iyer et al. | |
| 9,916,266 B2 | 3/2018 | Iyer et al. | |
| 10,002,095 B2 | 6/2018 | Iyer et al. | |
| 10,120,774 B2 | 11/2018 | Beers et al. | |
| 10,140,240 B2 | 11/2018 | Willey et al. | |
| 10,146,733 B2 | 12/2018 | Iyer et al. | |
| 10,176,212 B1* | 1/2019 | Prohofsky | G06F 16/2365 |
| 10,204,064 B2 | 2/2019 | Willey et al. | |
| 10,216,419 B2 | 2/2019 | De | |
| 10,216,661 B2 | 2/2019 | Iyer et al. | |
| 10,216,674 B2 | 2/2019 | Iyer et al. | |
| 10,248,591 B2 | 4/2019 | Safranek et al. | |
| 10,255,177 B2 | 4/2019 | Kan et al. | |
| 10,268,583 B2 | 4/2019 | Beers et al. | |
| 10,360,098 B2 | 7/2019 | Willey et al. | |
| 10,365,965 B2 | 7/2019 | Willey et al. | |
| 10,380,046 B2 | 8/2019 | Iyer et al. | |
| 10,380,059 B2 | 8/2019 | Willey et al. | |
| 10,387,339 B2 | 8/2019 | Iyer et al. | |
| 10,573,054 B2 | 2/2020 | Herr et al. | |
| 10,606,774 B2 | 3/2020 | Iyer et al. | |
| 10,795,841 B2 | 10/2020 | Iyer et al. | |
| 10,877,868 B2* | 12/2020 | Diaconu | G06F 11/1471 |
| 10,896,142 B2 | 1/2021 | Osawa et al. | |
| 10,909,055 B2 | 2/2021 | Iyer et al. | |
| 10,936,243 B2* | 3/2021 | Tsuchiya | G06F 3/067 |
| 11,080,212 B2 | 8/2021 | Iyer et al. | |
| 11,087,801 B1* | 8/2021 | Golov | G06F 13/1668 |
| 11,263,039 B2* | 3/2022 | Soman | G06F 9/45558 |
| 11,269,793 B2 | 3/2022 | Safranek et al. | |
| 11,768,628 B2* | 9/2023 | Otsuka | G06F 12/0246 |
| | | | 711/154 |
| 2003/0149837 A1* | 8/2003 | Coker | G06F 3/0634 |
| | | | 711/113 |
| 2004/0044826 A1* | 3/2004 | Dawson | G06F 3/0607 |
| | | | 711/4 |
| 2005/0182769 A1* | 8/2005 | Fujita | G06F 3/0623 |
| 2009/0037622 A1* | 2/2009 | Dheeresh | G06F 13/4072 |
| | | | 710/63 |
| 2009/0265511 A1* | 10/2009 | Fujita | G06F 3/0629 |
| | | | 711/170 |
| 2009/0276771 A1* | 11/2009 | Nickolov | H04L 67/1029 |
| | | | 718/1 |
| 2010/0057990 A1* | 3/2010 | Mizuno | G06F 3/0685 |
| | | | 711/170 |
| 2010/0059601 A1* | 3/2010 | Bankers | A01M 1/2077 |
| | | | 239/44 |
| 2010/0281211 A1* | 11/2010 | Ooigawa | G06F 16/10 |
| | | | 711/E12.098 |
| 2011/0022786 A1* | 1/2011 | Yeh | G11C 11/5628 |
| | | | 711/E12.001 |
| 2011/0225381 A1* | 9/2011 | Suto | G11C 11/5628 |
| | | | 711/E12.001 |
| 2011/0276757 A1* | 11/2011 | Jindo | G06F 12/126 |
| | | | 711/E12.019 |
| 2012/0179845 A1* | 7/2012 | Nie | G06F 13/102 |
| | | | 710/14 |
| 2013/0007488 A1* | 1/2013 | Jo | G06F 1/3287 |
| | | | 713/320 |
| 2013/0073793 A1* | 3/2013 | Yamagishi | G06F 13/16 |
| | | | 711/E12.008 |
| 2013/0318196 A1* | 11/2013 | Yamamoto | G06F 12/0893 |
| | | | 709/215 |
| 2014/0114928 A1 | 4/2014 | Beers et al. | |
| 2014/0201463 A1 | 7/2014 | Blankenship et al. | |
| 2015/0006237 A1* | 1/2015 | Beck | G06Q 10/0633 |
| | | | 705/7.27 |
| 2015/0067207 A1 | 3/2015 | Iyer et al. | |
| 2015/0081984 A1 | 3/2015 | Blankenship et al. | |
| 2015/0089161 A1 | 3/2015 | Beers et al. | |
| 2015/0089171 A1* | 3/2015 | Fujita | G06F 3/061 |
| | | | 711/162 |
| 2016/0062664 A1* | 3/2016 | Samuels | G06F 3/0679 |
| | | | 711/103 |
| 2017/0109286 A1 | 4/2017 | Blankenship et al. | |
| 2017/0206135 A1* | 7/2017 | Zeng | G06F 11/2094 |
| 2017/0371587 A1* | 12/2017 | Saito | G06F 3/0671 |
| 2018/0089206 A1* | 3/2018 | Tamura | G06F 16/128 |
| 2019/0095132 A1* | 3/2019 | Tatsumi | G06F 3/0641 |
| 2019/0250691 A1* | 8/2019 | Lee | G06F 1/3209 |
| 2019/0258577 A1* | 8/2019 | Lee | G06F 3/0634 |
| 2019/0265888 A1* | 8/2019 | Yang | G11C 11/5671 |
| 2019/0391939 A1 | 12/2019 | Safranek et al. | |
| 2020/0110716 A1* | 4/2020 | Mozak | G06F 18/214 |
| 2021/0117350 A1 | 4/2021 | Safranek et al. | |
| 2021/0263550 A1* | 8/2021 | Noh | H04L 7/0008 |
| 2021/0295921 A1* | 9/2021 | Suzuki | G11C 16/22 |
| 2022/0066951 A1* | 3/2022 | Kim | G06N 20/00 |
| 2022/0114122 A1 | 4/2022 | Safranek et al. | |
| 2022/0155972 A1* | 5/2022 | Edara | G06F 11/1466 |
| 2022/0166887 A1* | 5/2022 | Kawase | G06F 3/0679 |
| 2022/0253242 A1* | 8/2022 | Cresci | G06F 3/0656 |
| 2022/0269603 A1* | 8/2022 | Ravimohan | G06F 12/0261 |
| 2022/0283904 A1* | 9/2022 | Chopra | G06F 11/1451 |
| 2023/0054286 A1* | 2/2023 | Oh | G06F 3/0634 |
| 2023/0096111 A1* | 3/2023 | Kim | G06F 3/0656 |
| | | | 711/154 |
| 2024/0094913 A1* | 3/2024 | Tagami | G06F 3/0611 |
| 2024/0168666 A1* | 5/2024 | Jung | G06F 3/0679 |
| 2024/0338140 A1* | 10/2024 | Reddy | G06F 3/0664 |
| 2024/0411474 A1* | 12/2024 | Suzuki | G06F 3/067 |

* cited by examiner

MDI

| OPERATION MODES | OPERATION CONDITIONS | |
| --- | --- | --- |
| | PST | ADP |
| OMD1 | OCN1 | OCN1' |
| OMD2 | OCN2 | OCN2' |
| OMD3 | OCN3 | OCN3' |
| OMD4 | OCN4 | OCN4' |
| OMD5 | OCN5 | OCN5' |
| ⋮ | ⋮ | ⋮ |
| DOMD=OMD1 | | |

PERFORMANCE
FACTOR

| Fo |
| --- |
| IOB |
| QDP |
| NPL |
| CSZ |

Figure 6A:
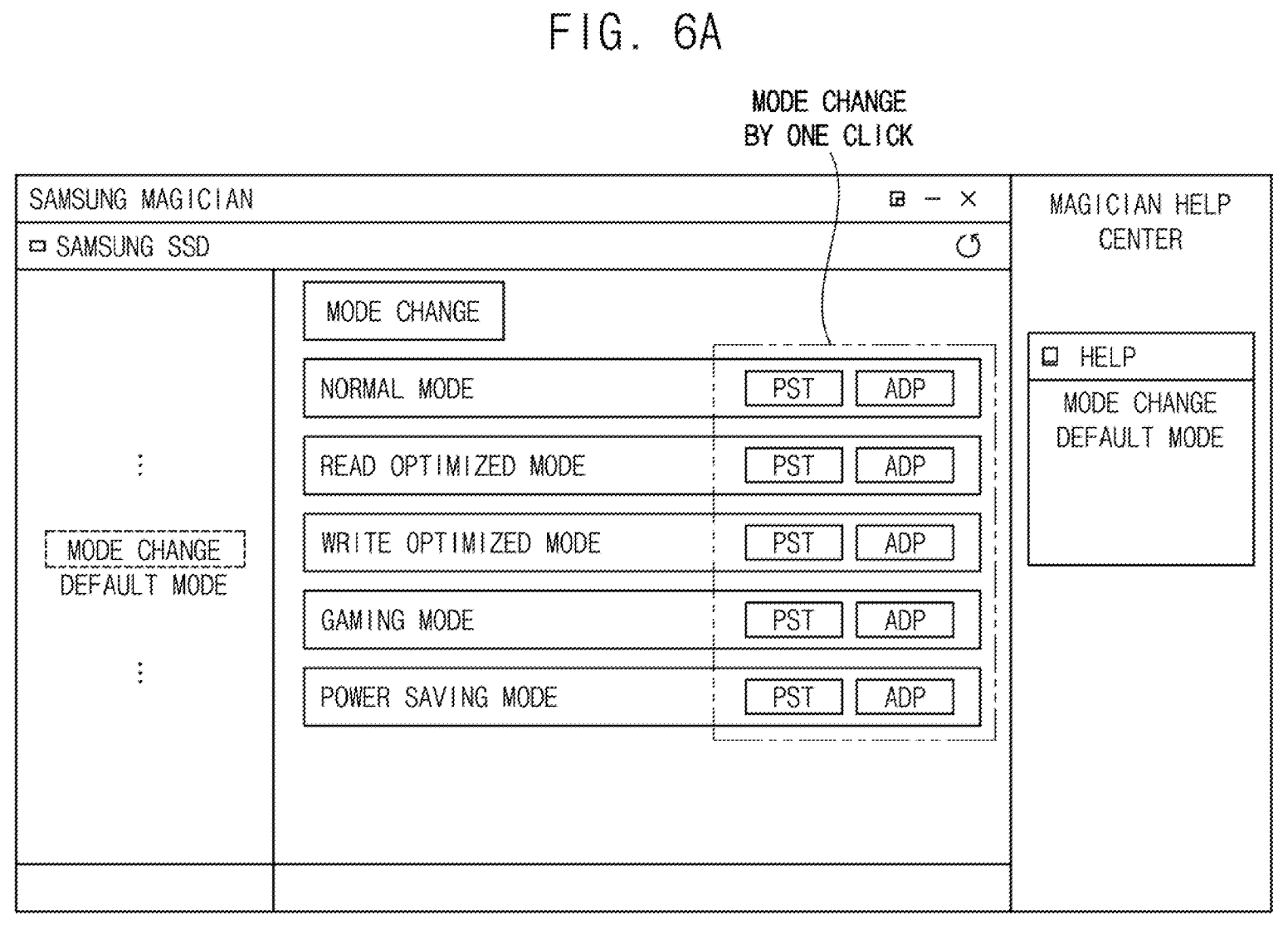

MODE CHANGE
BY ONE CLICK

SAMSUNG MAGICIAN

□ SAMSUNG SSD

MODE CHANGE
DEFAULT MODE

MODE CHANGE

NORMAL MODE

READ OPTIMIZED MODE

WRITE OPTIMIZED MODE

GAMING MODE

POWER SAVING MODE

PST ADP

PST ADP

PST ADP

PST ADP

PST ADP

MAGICIAN HELP
CENTER

□ HELP

MODE CHANGE
DEFAULT MODE

FIG. 6B

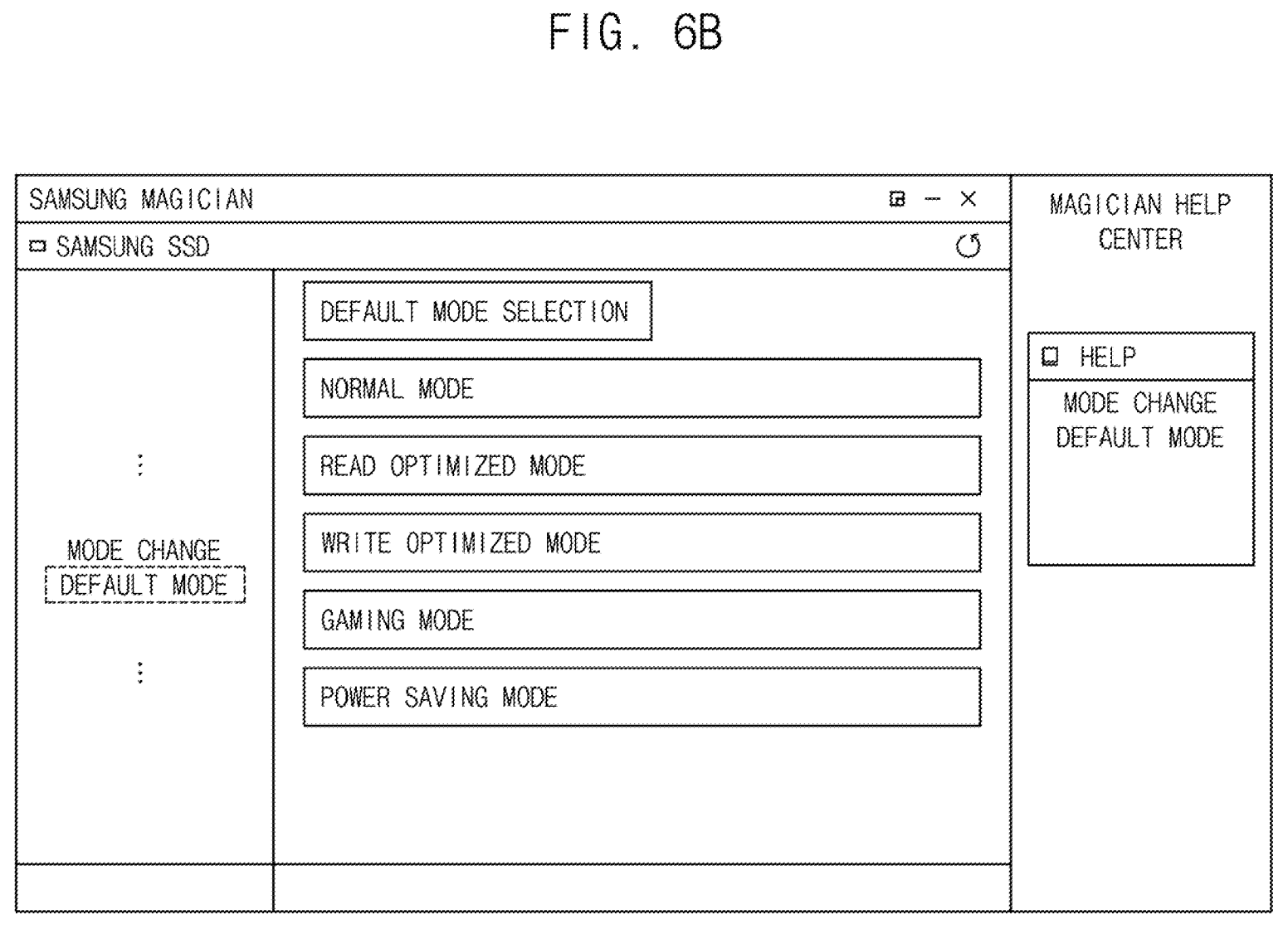

SAMSUNG MAGICIAN

☐ SAMSUNG SSD

MAGICIAN HELP CENTER

☐ HELP

MODE CHANGE
DEFAULT MODE

⊞ — ×

↺

DEFAULT MODE SELECTION

NORMAL MODE

READ OPTIMIZED MODE

WRITE OPTIMIZED MODE

GAMING MODE

POWER SAVING MODE

···

MODE CHANGE
[DEFAULT MODE]

| TLP PREFIXES (OPTIONAL) | TLP HEADER | DATA PAYLOAD | TLP DIGEST (OPTIONAL) |
|---|---|---|---|
| 0 \| 1 \| 2 \| ... | H \|H+1\|H+2\| ... | J \|J+1\|J+2\| ... | K \|K+1\|K+2\|K+3 |

BYTE

FIG. 10A

| BYTES | DESCRIPTION |
|-------|-------------|
| 63:60 | CDW15 |
| 59:56 | CDW14 |
| 55:52 | CDW13 |
| 51:48 | CDW12 |
| 47:44 | CDW11 |
| 43:40 | CDW10 |
| 39:24 | PRP ENTRY |
| 23:16 | MPTR |
| 15:08 | RESERVED |
| 07:04 | NSID |
| 03:00 | CDW0 |

FIG. 10B

| BIT | DESCRIPTION |
|-----|-------------|
| 31:16 | CID |
| 15:14 | PSDT |
| 13:10 | RESERVED |
| 09:08 | FUSE |
| 07:00 | OPC |

FIG. 17

STORAGE SYSTEM AND METHOD OF CONTROLLING OPERATION OF THE SAME

CROSS-REFERENCE TO RELATED APPLICATION

Korean Patent Application No. 10-2022-0157548, filed on Nov. 22, 2022, in the Korean Intellectual Property Office, is incorporated by reference herein in its entirety.

BACKGROUND

1. Field

A storage system and a method of controlling operation of a storage system is disclosed.

2. Description of the Related Art

Recently a storage device such as a solid-state drive (SSD) has been widely used.

SUMMARY

Embodiments are directed to a method of controlling operation of a storage system including a storage device and a host device configured to control the storage device including determining, by a host device, a selected operation mode from among a plurality of operation modes of a storage device notifying, by the host device, the selected operation mode to the storage device, setting, by the storage device, an operation condition of the storage device to a selected operation condition corresponding to the selected operation mode, and performing, by the storage device, an input-output operation with the host device based on the selected operation condition.

Embodiments are also directed to a storage system including an interconnector, a storage device connected to the interconnector and configured to store data, and a host device connected to the interconnector and configured to control operation of the storage device, wherein, the host device determines a selected operation mode from among a plurality of operation modes of a storage device and notifies the selected operation mode to the storage device, and the storage device sets an operation condition of the storage device to a selected operation condition corresponding to the selected operation mode and performs an input-output operation with the host device based on the selected operation condition.

Embodiments are also directed to a storage device including a nonvolatile memory device configured to store data, and a storage controller configured to control the nonvolatile memory device, wherein the storage controller sets an operation condition of the storage device to a selected operation condition corresponding to a selected operation mode and performs an input-output operation with a host device based on the selected operation condition, the selected operation mode being determined based on a command transferred from the host device.

BRIEF DESCRIPTION OF THE DRAWINGS

Features will become apparent to those of skill in the art by describing in detail exemplary embodiments with reference to the attached drawings in which:

FIGS. 6A and 6B are diagrams of a graphic user interface in a method of controlling operation of a storage system according to example embodiments.

FIG. 9 is a diagram of a packet that is transferred in a storage system according to example embodiments.

FIGS. 10A and 10B are diagrams of a command that is transferred in a storage system according to example embodiments.

FIG. 10B is a diagram of an example format of a lowest double word included in the command of FIG. 10A.

FIG. 17 is a block diagram of a storage device according to example embodiments.

DETAILED DESCRIPTION

Figure 1:
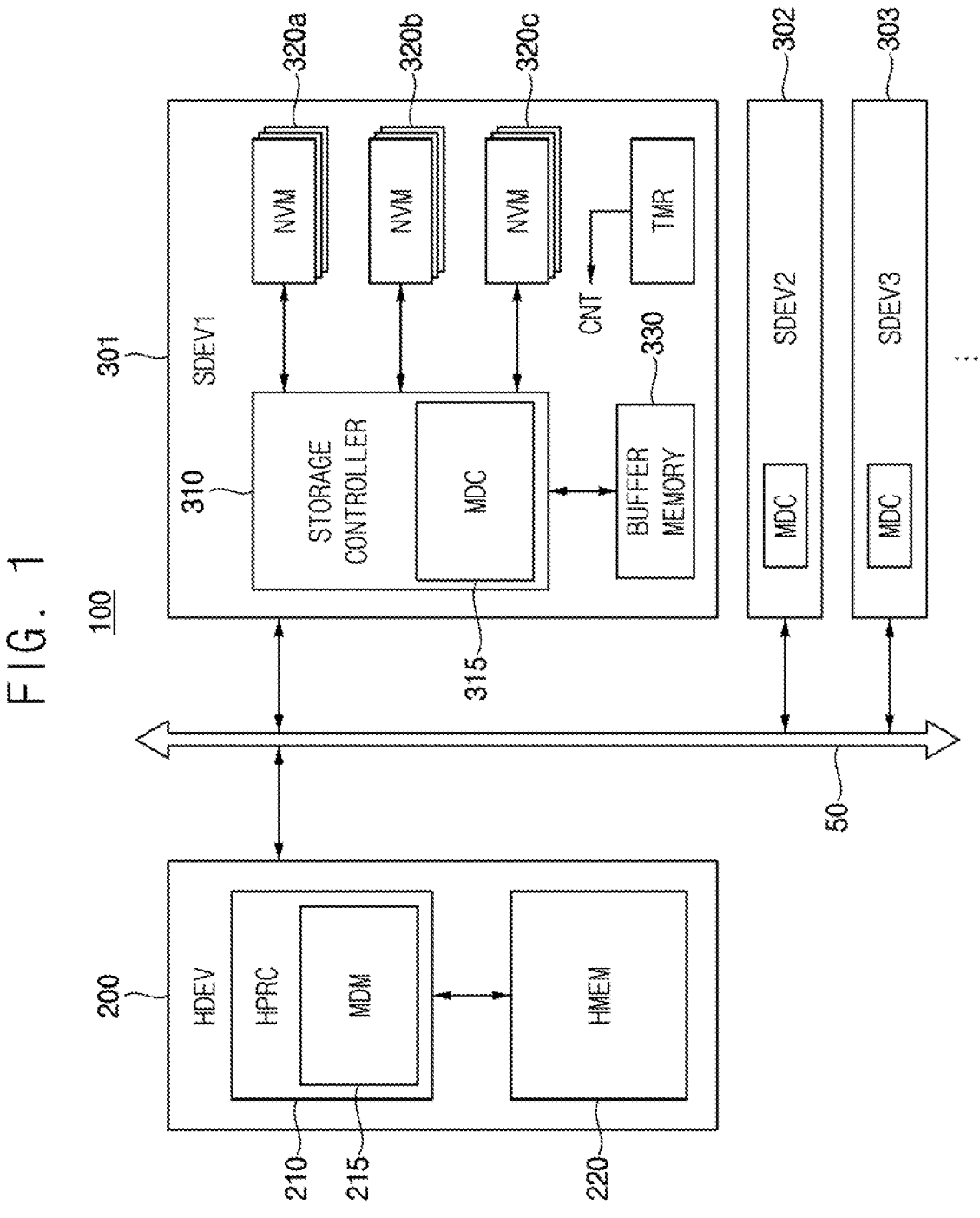
FIG. 1 is a block diagram of a storage system according to example embodiments.
Figure 2:
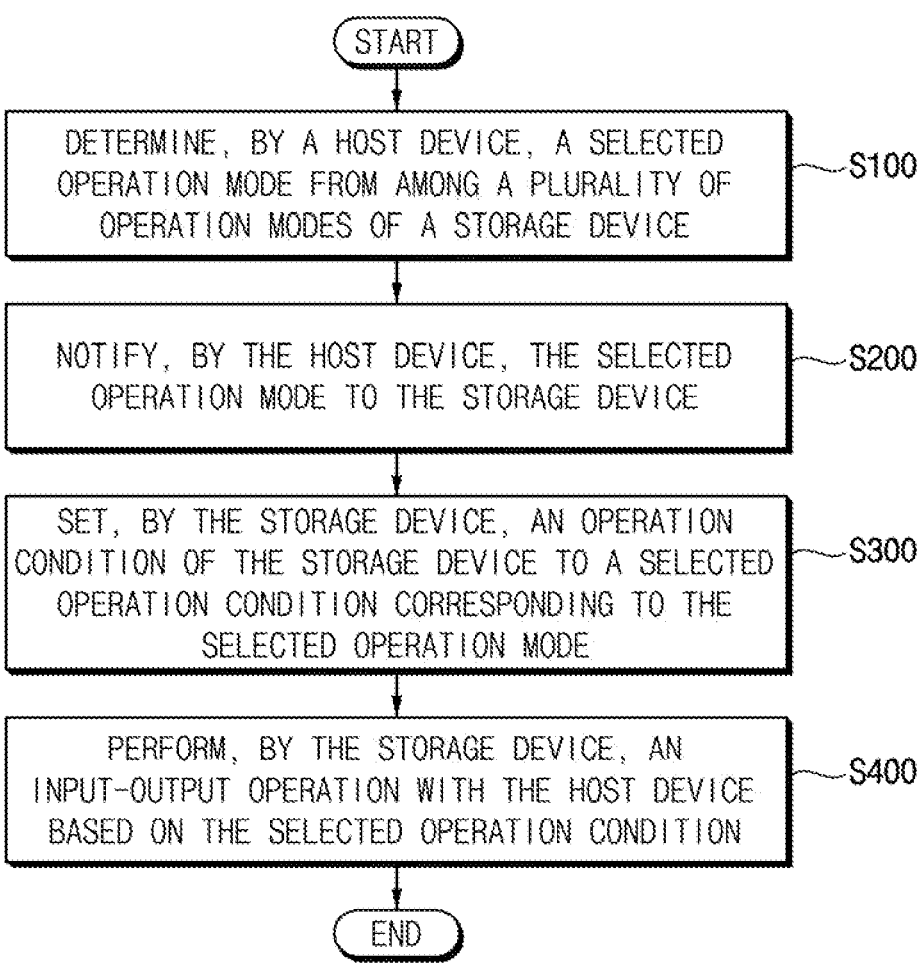
FIG. 2 is a flowchart of a method of controlling operation of a storage system according to example embodiments.

FIG. 1 is a block diagram of a storage system according to example embodiments, and FIG. 2 is a flowchart of a method of controlling operation of a storage system according to example embodiments. Referring to FIG. 1, a storage system 100 may include a host device HDEV 200 and one or more storage devices SDEV1, SEV2 and SDEV3 301, 302 or 303. As used herein, the term "or" is not an exclusive term, e.g., "A or B" would include A, B, or A and B.

The host device 200 and the storage devices 301, 302 and 303 may be connected to an interconnector 50 and exchange signals and/or data through the interconnector 50. The interconnector 50 may be referred to as a network fabric. The interconnector 50 may be implemented with any suitable networking protocol and/or medium, such as Ethernet, Fiber Channel, or InfiniBand, as well as either directly or through intermediary devices such as switches or hubs, which may be part of interconnector 50. The interconnector 50 may be implemented with any other communication or interconnect protocol that may enable communication between the host device 200 and the storage devices 301, 302 and 303, such as PCIe (peripheral component interconnect express), SATA (Serial ATA), SAS (Serial Attached SCSI), or OcuLink.

The host device 200 controls overall operations of the storage system 100. The host device 200 may include a host processor HPRC 210 and a host memory HMEM 220.

The host processor 210 may control an operation of the host device 200. In an implementation, the host processor 210 may execute an operating system (OS). In addition, the host processor 210 may execute various applications running on the OS. The host processor 210 may be a homogeneous multi-core processor or a heterogeneous multi-core Processor that may include at least two processor cores independently executing program instructions.

The host memory 220 may store instructions and/or data that may be executed and/or processed by the host processor 210. In an implementation, the OS or applications may be loaded into the host memory 220 during booting. In an implementation, when the storage system 100 boots, the OS stored in one of the storage devices 301, 302 and 303 may be loaded into the host memory 220, and then applications may be loaded by the OS into the host memory 220.

FIG. 1 illustrates three storage devices for convenience of illustration and description In some example embodiments, the storage system may include a single storage device. Hereinafter example embodiments are described based on the one storage device 301, and the other storage device 302 and 303 may have the same or similar configuration.

The storage device 301 may be accessed by, that is, communicably coupled to the host device 200. The storage device 301 may include a storage controller 310, a plurality of nonvolatile memories NVM 320*a*, 320*b* and 320*c*, a buffer memory 330 and a storage timer TMR.

The storage controller 310 may control an operation of the storage device 301, e.g., a (data) write operation and/or a (data) read operation, based on a command and data that may be received from the host device 200.

The plurality of nonvolatile memories 320*a*, 320*b* and 320*c* may store a plurality of data. In an implementation, the plurality of nonvolatile memories 320*a*, 320*b* and 320*c* may store metadata, or various user data.

In some example embodiments, each of the plurality of nonvolatile memories 320*a*, 320*b* and 320*c* may include a NAND flash memory. In other example embodiments, each of the plurality of nonvolatile memories 320*a*, 320*b* and 320*c* may include one of an electrically erasable programmable read only memory (EEPROM), a phase change random access memory (PRAM), a resistance random access memory (RRAM), a nano floating gate memory (NFGM), a polymer random access memory (PoRAM), a magnetic random access memory (MRAM), a ferroelectric random access memory (FRAM), or a thyristor random access memory (TRAM).

The buffer memory 330 may store instructions and/or data that may be executed and/or processed by the storage controller 310, and may temporarily store data stored in or to be stored into the plurality of nonvolatile memories 320*a*, 320*b* and 320*c*. In an implementation, the buffer memory 330 may include at least one of various volatile memories, e.g., a static random access memory (SRAM), or a dynamic random access memory (DRAM).

In some example embodiments, the storage device 301 may be a universal flash storage (UFS). In other example embodiments, the storage device 301 may be a solid state drive (SSD), a multi-media card (MMC) or an embedded multi-media card (eMMC). In still other example embodiments, the storage device 301 may be one of a secure digital (SD) card, a micro SD card, a memory stick, a chip card, a universal serial bus (USB) card, a smart card, or a compact flash (CF) card.

In some example embodiments, the storage device 301 may be connected to the host device 200 through the interconnector 50 which may include, e.g., a UFS, an eMMC, a serial advanced technology attachment (SATA) bus, a nonvolatile memory express (NVMe) bus, or a serial attached SCSI (SAS) bus.

The host device 200 may include a mode manager MDM 215, and the storage device 301 may include a mode controller MDC 315. Also the other storage devices 302 and 303 may include mode controllers MDC, respectively. FIG. 1 illustrates an example embodiment that the mode manager 215 may be included in the host processor 210 of the host device 200 and the mode controller 315 may be included in the storage controller 310 of the storage device 301. In some example embodiments, the mode manager 215 and/or the mode controller 315 may be implemented as independent hardware logic distinct from the host processor 210 and/or the storage controller 310.

Referring to FIGS. 1 and 2, by the mode manager 215 of the host device 200, a selected operation mode may be determined from among a plurality of operation modes of the storage device 301 (S100). In some example embodiments, as will be described below with reference to FIG. 5, the mode manager 215 may be a portion of the operating system and the application, and the mode manager 215 may determine the selected operation mode by monitoring the input-output type of the storage device 301 or the operation pattern of the storage system 100. In some example embodiments, as will be described below with reference to FIGS. 6A and 6B, the mode manager 215 may determine the selected operation mode based on user's input through a graphic user interface.

By the host device 200, the selected operation mode may be notified to the storage device 301 (S200). In some example embodiments, the notification of the selected operation mode may be transferred from the host device 200 to the storage device 301 using a request or a command according to the type of the interconnector 50.

By the storage device 301, an operation condition of the storage device 301 may be set to a selected operation condition corresponding to the selected operation mode (S300). Example embodiments of setting the operation condition will be described below with reference to FIGS. 3 and 4.

By the storage device, an input-output operation with the host device may be performed based on the selected operation condition (S400). The input-output operation may include a write operation to store data provided from the host device 200 in the storage device 301 and a read operation to provide data read from the storage device 301 to the host device 200. Example embodiments of configuration and operation of the storage device 301 will be described below with reference to FIGS. 15 through 18.

As such, the storage system 100 and the method of controlling operation of the storage system 100 according to example embodiments may enhance performance of the storage device 301 and the storage system 100 by selecting the operation mode corresponding to the operation pattern of the storage system 100 to optimize the operation conditions of the storage device 301.

Figures 3, 4:
FIG. 3 is a diagram of a method of controlling operation of a storage system according to example embodiments.
FIG. 4 is a diagram of a method of controlling operation of a storage system according to example embodiments.

FIG. 3 is a diagram of a method of controlling operation of a storage system according to example embodiments. Referring to FIGS. 1 and 3, mode information MDI may include information on a plurality of operation conditions OCN1~OCN5 respectively corresponding to a plurality of operation modes OMD1~OMD5 and information on a default operation mode DOMD.

The storage device 301 may operate in one of the plurality of operation modes OMD1~OMD5 that may be predetermined according to an input-output type of the storage device 301 or various operation patterns of the storage system 100. Five operation modes are shown in FIG. 3. In addition, a plurality of operation conditions OCN1~OCN5 respectively corresponding to the plurality of operation modes OMD1~OMD5 may be set in advance. Here, the operation conditions refer to factors affecting user experience according to power consumption of the storage device 301, performance of the storage device 301, and/or performance of the storage system 100.

Each of the plurality of operation modes OMD1~OMD5 may include a preset option PST for fixing operation conditions and an adaptive option ADP for changing operation conditions. The plurality of operation conditions OCN1~OCN5 corresponding to the preset option PST may be fixed regardless of the operating state of the storage device 301, and the plurality of operation conditions OCN1'~OCN5' corresponding to the adaptive option ADP may vary according to an operating state of the storage device 301.

A plurality of operation conditions OCN1~OCN5 corresponding to the preset option PST may be preset to optimal conditions through a test process by the manufacturer of the storage device 301, and the operation conditions may be stored in nonvolatile memory means such as the nonvolatile memory device NVM or a read only memory (ROM) included in the storage device 301.

Optimal operation conditions of the storage device 301 may vary depending on the deterioration state of the nonvolatile memory device (NVM), or the actual operating state of the storage device 301. In an example embodiment, the plurality of operation conditions OCN1'~OCN5' corresponding to the adaptive option ADP may be changed by the storage device 301.

As described above, the host device 200 may determine one of the plurality of operation modes OMD1~OMD5 as the selected operation mode. Also, by the host device 200, one of the preset option PST for fixing the selected operation condition corresponding to the selected operation mode and the adaptive option ADP for changing the selected operation condition may be selected as a selected option. As will be described below with reference to FIG. 8, the selected operation mode and the selected option may be notified from the host device 200 to the storage device 301. When the selected option corresponds to the adaptive option ADP, the storage device 301 may analyze a pattern of commands transmitted from the host device 200 to change the selected operation condition corresponding to the selected operation mode. The pattern of commands may include an occurrence frequency of all commands, a frequency of read commands, a frequency of write commands, or a ratio of read commands to write commands.

The storage device 301 may store mode information MDI including the variable selected operation condition in the nonvolatile memory device NVM included in the storage device 301 when the storage device 301 is powered off. The storage device 301 may set operation conditions of the storage device 301 based on the mode information MDI stored in the nonvolatile memory device NVM when the storage device 301 is powered on. In an implementation, when the third operation mode OMD3 is determined to be the selected operation mode, the storage device 301 may replace the fixed operation condition OCN3 corresponding to the preset option PST with the operation condition OCN3' that is the most recently stored according to the adaptive option ADP.

In some example embodiments, the default operation mode DOMD may be determined from among the plurality of operation modes OMD1~OMD5 by the host device 200. FIG. 3 shows an example in which the first operation mode OMD1 is determined as the default operation mode DOMD. The default operation mode DOMD may be determined by internal software of the host device 200 or based on a user's input through a graphic user interface.

The host device 200 may notify the storage device 301 of the default operation mode DOMD. The storage device 301 may store the mode information MDI including the default operation mode DOMD in the nonvolatile memory device NVM included in the storage device 301 when the storage device 301 is powered off. The storage device 301 may set the default operation mode DOMD as the selected operation mode based on the mode information MDI stored in the nonvolatile memory device NVM when the storage device 301 is powered on. The storage device 301 may operate in the default operation mode DOMD from when the storage device 301 is powered on until receiving a notification of a change in the selected operation mode from the host device 200.

FIG. 4 is a diagram of performance factors in a method of controlling operation of a storage system according to example embodiments. Referring to FIG. 4, a factor affecting the user experience according to the power consumption and/or the performance of the storage device 301 and/or the storage system 100 may be referred to a performance factor. In an implementation, the performance factors may include an operation frequency Fo of the storage device, an input-output bandwidth IOB of the storage device, a queue depth QDP indicating a maximum number of requests stored in a request queue, a maximum number NPL of memory planes that may be activated simultaneously, a size CSZ of a cache memory in the storage device.

Figure 5:
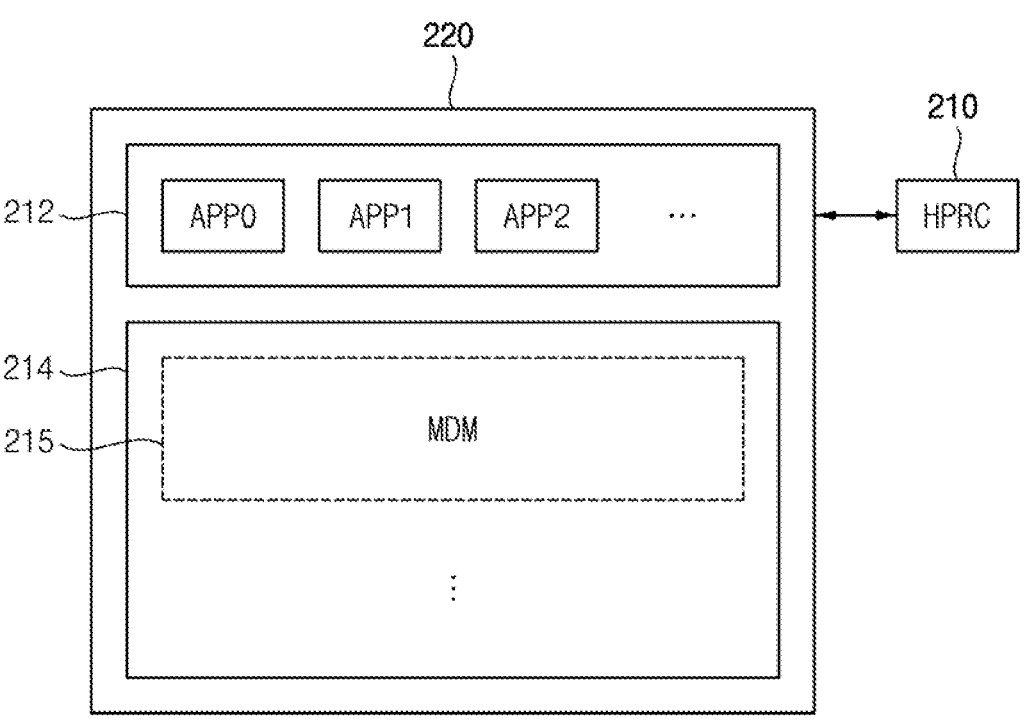
FIG. 5 is a diagram of a mode manager implemented in a host device of a storage system according to example embodiments.

FIG. 5 is a diagram of a mode manager implemented in a host device of a storage system according to example embodiments. FIG. 5 illustrates a software layer structure of the storage system 100 shown in FIG. 1. Referring to FIG. 5, a software layer structure of the storage system 100 loaded into the host memory 220 and driven by the host processor 210 may be divided into an application program 212 and a kernel 214 of the operating system (OS). The OS may further include one or more device drivers to manage various devices such as a memory, a modem, or an image processing device.

The application program 212 may be upper layer software driven as basic service or driven by a user's request. A plurality of application programs APP0, APP1 and APP2 may be simultaneously executed to provide various services. The application programs APP0, APP1 and APP2 may be executed by the host processor 210 after being loaded into the host memory 220.

The kernel 214, as a component of the OS, performs a control operation between the application program 212 and hardware. The kernel 214 may include program execution, interrupt, multi-tasking, memory management, a file system, and a device driver.

A user space where the application programs 212 are located and a kernel space where the kernel 214 including the mode manager 215, an input/output scheduler, and a device driver are located may be separated from each other. The application programs 212 cannot directly access a resource such as the storage device 301 of FIG. 1. Instead, the application programs 212 may call a function defined in a library containing a system call function and may request a necessary operation from the kernel 214. When a system call function is called, it can switch from user mode to kernel mode.

The mode manager 215 may correspond to a portion of the operating system and an application, and FIG. 5 illustrates an example in which the mode manager 215 may be provided as a portion of the kernel 214 for convenience of illustration. The mode manager 215 may monitor an input-output type of the storage device 301 or an operation pattern of the storage system 100 to determine the selected operation mode from among the plurality of operation modes as described above. Patterns of access or input-output of the application programs APP0, APP1, and APP2 with respect to the storage device 301 may be different from each other. In one embodiment, the mode manager 215 may determine the selected operation mode by monitoring which application program is currently being executed or whether the occupancy rate of the storage device 301 of a specific application program is remarkably high. In another embodiment, the mode manager 215 may determine the selected operation mode by monitoring all access patterns of the host device 200 to the storage device 301 regardless of application programs.

FIGS. 6A and 6B are diagrams of a graphic user interface in a method of controlling operation of a storage system according to example embodiments. 6A illustrates an example of a graphic user interface for determining the above-described selected operation mode, and FIG. 6B illustrates an example of a graphic user interface for determining the above-described default operation mode. The graphic user interfaces of FIGS. 6A and 6B may be implemented by an application program (e.g., SAMSUN MAGICIAN) for storage management executed by the host processor of the host device.

Referring to FIGS. 6A and 6B, a plurality of operation modes of the storage device may include a normal mode, a read optimized mode, a write optimized mode, a gaming mode, and a power saving mode. The normal mode may be an operation mode corresponding to the most common operation conditions of a storage system. The read optimized mode may be an operation mode corresponding to an operation condition for improving read operation performance rather than write operation performance, and the write optimized mode corresponds to an operation condition for improving write operation performance rather than read operation performance. The gaming mode may be an operation mode corresponding to an operation condition suitable for execution of a gaming application program that frequently requires access (or input-output) to a storage device. The power saving mode may be an operation mode corresponding to an operation condition suitable for execution of an application program having a significantly low frequency of access to the storage device.

As shown in FIG. 6A, ten buttons for selecting a preset option PST and an adaptive option ADP for each of the five operation modes may be provided. Accordingly, the user may determine the above-described selected operation mode and selected option with a single click operation. Meanwhile, information for a user's decision may be provided by clicking on HELP items.

As such, the host device may provide the graphic user interface as shown in FIG. 6A and receive a user's input through the graphic user interface. The host device may determine the selected operation mode and a selected option based on the user's input.

As shown in FIG. 6B, five buttons may be provided for selecting one of the five operation modes as a default operation mode. The user can determine the aforementioned default operation mode with a single click operation. Meanwhile, information for a user's decision may be provided by clicking on HELP items.

As such, the host device may provide the graphic user interface as shown in FIG. 6B and receive a user's input through the graphic user interface. The host device may determine the default operation mode based on the user's input.

Figure 7:
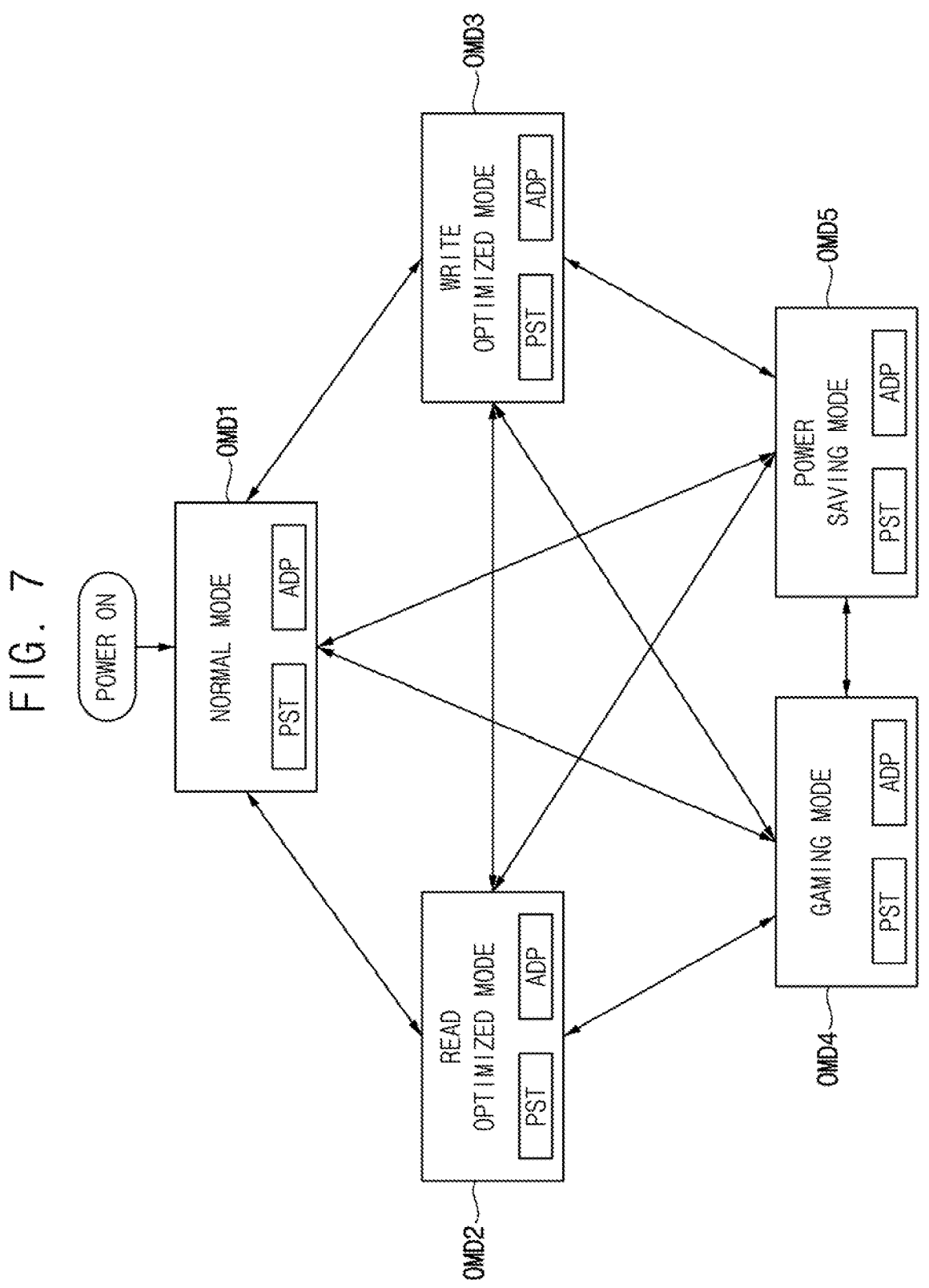
FIG. 7 is a conceptual diagram of an operation mode change of a storage system according to example embodiments.

FIG. 7 is a conceptual diagram of an operation mode change of a storage system according to example embodiments. Referring to FIG. 7, the first operation mode OMD1 may correspond to the normal mode, the second operation mode OMD2 may correspond to the read optimized mode, and the third operation mode OMD3 may correspond to the write optimized mode. The fourth operation mode OMD4 may correspond to the gaming mode, and the fifth operation mode OMD5 may correspond to the power saving mode. As described above, each of the plurality of operation modes OMD1~OMD5 may be set to one of the preset option PST for fixing the selected operation condition and the adaptive option ADP for changing the selected operation condition.

When the storage device is powered on, the storage device may determine the above-described default operation mode (e.g., the first operation mode OMD1) as the selected operation mode. Thereafter, the selected operation mode may be changed based on a notification transmitted from the host device during operation of the storage device. In this way, based on a notification from the host device (e.g., a command transmitted from the host device as will be described later with reference to FIG. 8), an operation mode selected from among the plurality of operation modes OMD1~OMD5 may be automatically set, and the selected operation mode may be adaptively changed while the storage device operates.

Figure 8:
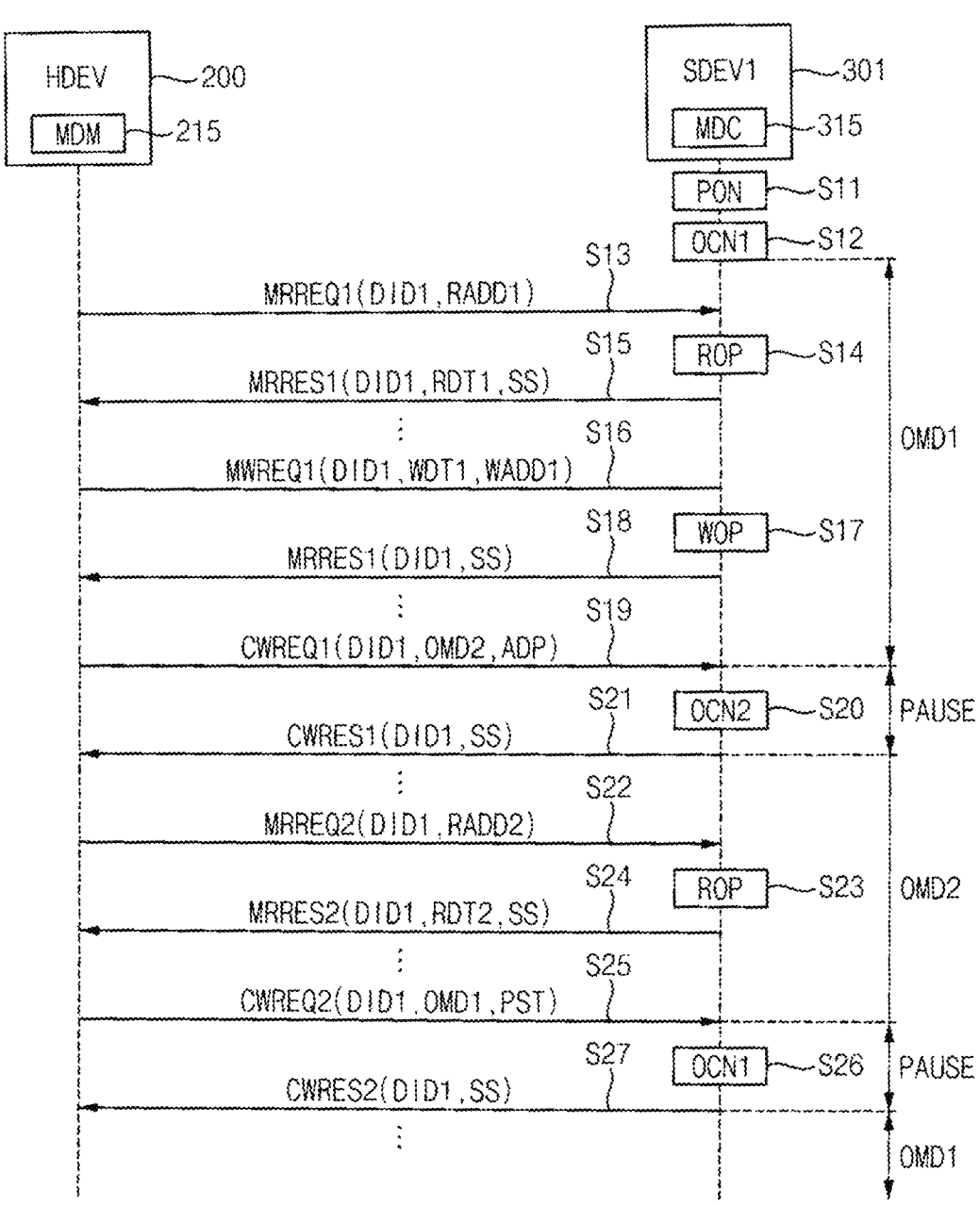
FIG. 8 is a sequence diagram of a method of controlling operation of a storage system according to example embodiments.

FIG. 8 is a sequence diagram of a method of controlling operation of a storage system according to example embodiments. Referring to FIGS. 1, 7, and 8, the first storage device 301 may be powered on (S11), and the mode controller 315 of the first storage device 301 may determine the operation condition of the first storage device 301 as the first operation condition OCN1 corresponding the first operation mode OMD1 that is determined as the default operation mode (S12).

The host device 200 may transfer a first memory read request MRREQ1 including a first device identifier DID1 indicating the first storage device 301 and a first read address RADD1 to the first storage device 301 (S13). The first storage device 301 may perform a read operation ROP based on the first operation condition OCN1 (S14). When the data read is successful, the first storage device 301 may transfer a first memory read response MRRES1 including the first device identifier DID, first read data RDT1 corresponding to the first read address RADD1 and read success information SS to the host device 200 (S15).

Meanwhile, the host device 200 may transfer a first memory write request MWREQ1 including the first device identifier DID1, first write data WDT1, and a first write address WADD1 to the storage device 301 (S16). The first storage device 301 may perform a write operation WOP based on the first operation condition OCN1 (S17), and store the first write data WDT1 in the first write address WADD1 of the nonvolatile memory device in the first storage device 301. When the storage is completed, the first storage device 301 may transfer a first memory write response MWRES1 including the first device identifier DID1 and write success information SS to the host device 200 (S18).

As such, the first storage device 301 may operate in the first operation mode OMD1 determined as the default operation mode after being powered on.

Then, when there is a change in the operation pattern of the storage system, the mode manager 215 of the host device 200 may determine to change the selected operation mode of the first storage device 301 to the second operation mode OMD2.

The host device 200 may transfer a first configuration write request CWREQ1 including the first device identifier DID1 indicating the first storage device 301, a mode identifier indicating the second operation mode OMD2 determined as the selected operation mode, and an adaptive option ADP determined as the selected option to the first storage device 301 (S19). The mode controller 315 of the first storage device 301 may set the operation condition of the first storage device 301 as the second operation condition OCN2 corresponding to the second operation mode OMD2 determined as the selected operation mode (S20). When the setting of the second operation condition OCN2 is completed, the first storage device 301 may transfer a first configuration write response CWRES1 including the first device identifier DID1 and setting success information SS to the host device 200 (S21).

In this way, the host device 200 may transmit a request or command including a mode identifier indicating the selected operation mode to the first storage device 301, and the first storage device 301 may perform set the operation condition of the first storage device 301 as the selected operation condition corresponding to the selected operation mode. After setting the operation condition of the first storage device 301 as the selected operation condition, the first storage device 301 may notify the host device 200 that entry into the selected operation mode is completed. Meanwhile, the first storage device 301 may pause (PAUSE) an input-output operation from when the first storage device 301 receives the notification of the selected operation mode until the first storage device 301 notifies the host device 200 that entry into the selected operation mode has been completed.

Then, the host device 200 may transfer the second memory read request MRREQ2 including the first device identifier DID1 and a second read address RADD2 to the first storage device 301 (S22). The first storage device 301 may perform a read operation ROP based on the second operation condition OCN2 (S23). When the data read is successful, the first storage device 301 may transfer second memory read response MRRES2 including the first device identifier DID1 and the read success information SS to the host device 200 (S24).

In this way, the first storage device 301 may operate in the second operation mode OMD2 determined as the selected operation mode according to a notification from the host device 200.

Then, when there is a change in the operation pattern of the storage system, the mode manager 215 of the host device

200 may determine to change the selected operation mode of the first storage device 301 back to the first operation mode OMD1.

The host device 200 may transfer a second configuration write request CWREQ2 including the first device identifier DID1 indicating the first storage device 301, the mode identifier indicating the first operation mode OMD1 determined as the selected operation mode, and the preset option PST determined as the selected option to the first storage device 301 (S25). The mode controller 315 of the first storage device 301 may set the operation condition of the first storage device 301 as the first operation condition OCN1 corresponding to the first operation mode OMD1 determined as the selected operation mode (S26). When the setting of the first operation condition OCN1 is completed, the first storage device 301 may transfer a second configuration write response CWRES2 including the first device identifier DID1 and setting success information SS to the host device (S27). Thereafter, the first storage device 301 may operate in the first operation mode OMD1 determined as the selected operation mode.

As described with reference to FIG. 8, the first storage device 301 may change the selected operation mode according to the control of the host device 200 while the first storage device 301 operates.

Figure 9:
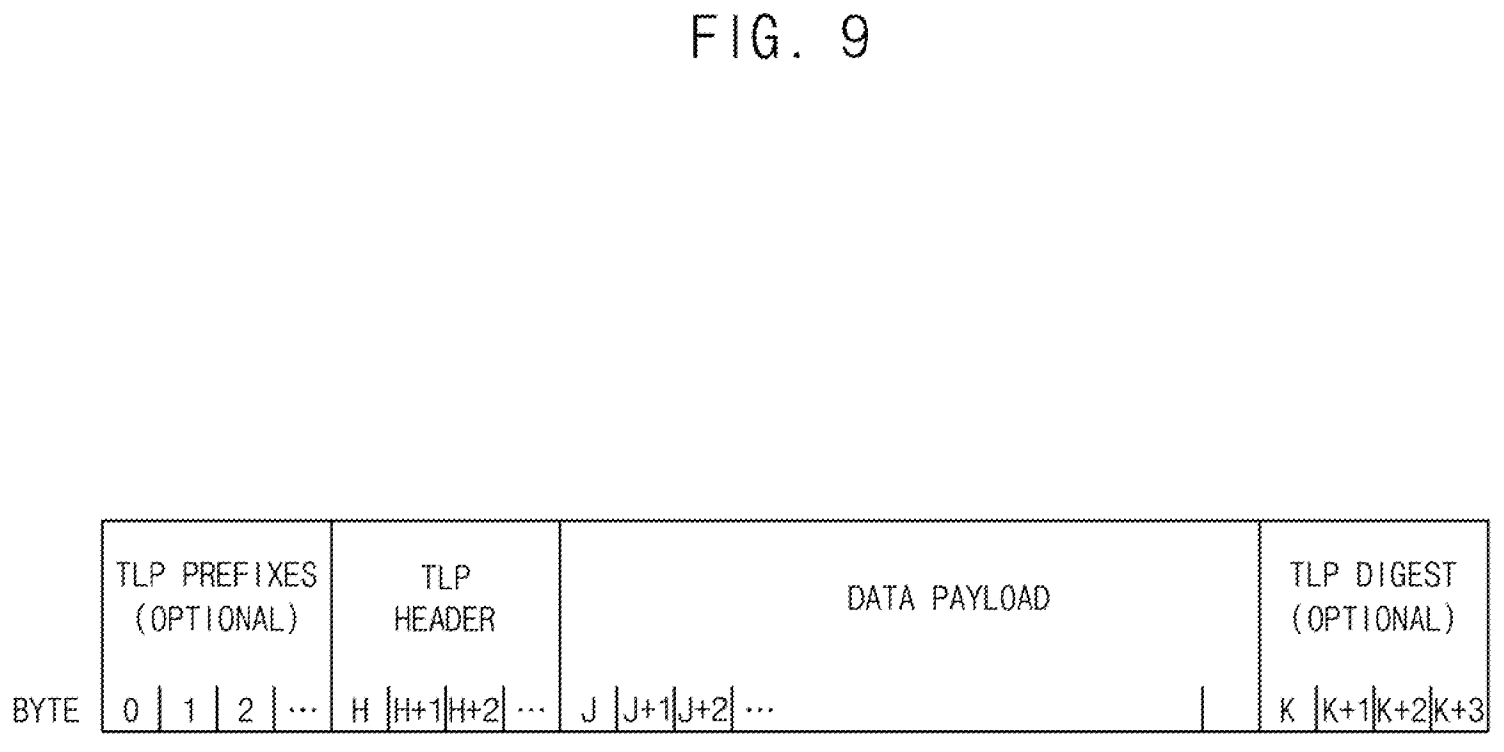

FIG. 9 is a diagram of a packet that is transferred in a storage system according to example embodiments. FIG. 9 illustrates a format of a transaction layer packet (TLP) that may be generated and managed by a transaction layer of a PCIe architecture.

The Transactions consists of requests (or commands) and completions (or responses), which are communicated using packets. As illustrated in FIG. 9, a TLP may include one or more optional TLP Prefixes, a TLP header, a data payload, and an optional TLP Digest, which may be allocated to a plurality of bytes (BYTE 0~k+3).

The memory write request, the memory write response, the configuration write request, the configuration write response, the memory read request and the memory read response as described above may correspond to the TLPs as illustrated in FIG. 9. The TLP header may include various information such as a device identifier, success information for the corresponding request and so on, and the data payload may include the data block, the logic address, the mode identifier indicating the selected operation mode and so on.

FIGS. 10A and 10B are diagrams of a command that is transferred in a storage system according to example embodiments. FIG. 10A illustrates an example format of a command according to the NVMe protocol, and FIG. 10B illustrates an example format of a lowest double word included in the command of FIG. 10A.

Referring to FIG. 10A, each command may have a predetermined size, e.g., 64 bytes. In FIG. 10A, a lowest double word CDW0 may be common to all commands. A double word corresponds to four bytes. A namespace identifier (NSID) field may specify a namespace ID to which a command may be applied. If the namespace ID is not used for the command, then NSID field may be cleared to 0 h. The 08 through 15 bytes may be reserved. A metadata pointer (MPTR) field may be valid and used only if the command includes metadata. A physical region page (PRP) entry field may specify data used by the command. The upper double words CDW10 through CDW15 may have specific usage for each command.

Referring to FIG. 10B, an operation code (OPC) field may specify a code of the command to be executed. A fused operation (FUSE) code may specify whether the command is part of a fused operation. The 10th through 13th bits may be reserved. A PRP or scatter gather list (SGL) for data (PSDT) field may specify whether PRPs or SGLs are used for any data transfer associated with the command. A command identifier (CID) field may specify a unique identifier for the command.

The command including the above-described mode identifier indicating the selected operation mode may correspond to the vendor specific command that is reserved by the NVMe standard.

Figure 11:
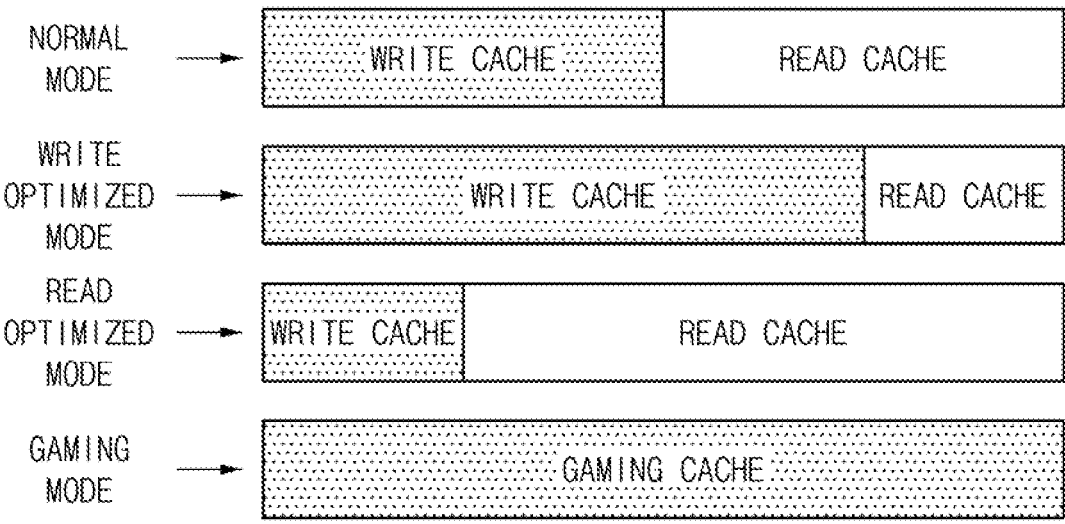
FIG. 11 is a diagram of operation conditions in a method of controlling operation of a storage system according to example embodiments.

FIG. 11 is a diagram of operation conditions in a method of controlling operation of a storage system according to example embodiments. In some example embodiments, the operation condition of the storage device may include the size of the cache memory. The cache memory may correspond to a partial area of the buffer memory 330 in FIG. 1.

Referring to FIG. 11, the cache memory may include a read cache storing data for a read operation and a write cache storing data for a write operation. In the normal mode, the size of the write cache and the read cache may be set to be the same. In the read optimized mode corresponding to the operation condition for improving the performance of the read operation rather than the performance of the write operation, the size of the read cache may be increased and the size of the write cache may be decreased. On the other hand, in the write optimized mode corresponding to the operation condition for improving the performance of the write operation rather than the performance of the read operation, the size of the write cache may be increased and the size of the read cache may be decreased. In the gaming mode, the buffer memory 330 may be allocated a gaming cache dedicated to a game application program by integrating the write cache and the read cache.

Figure 12A:
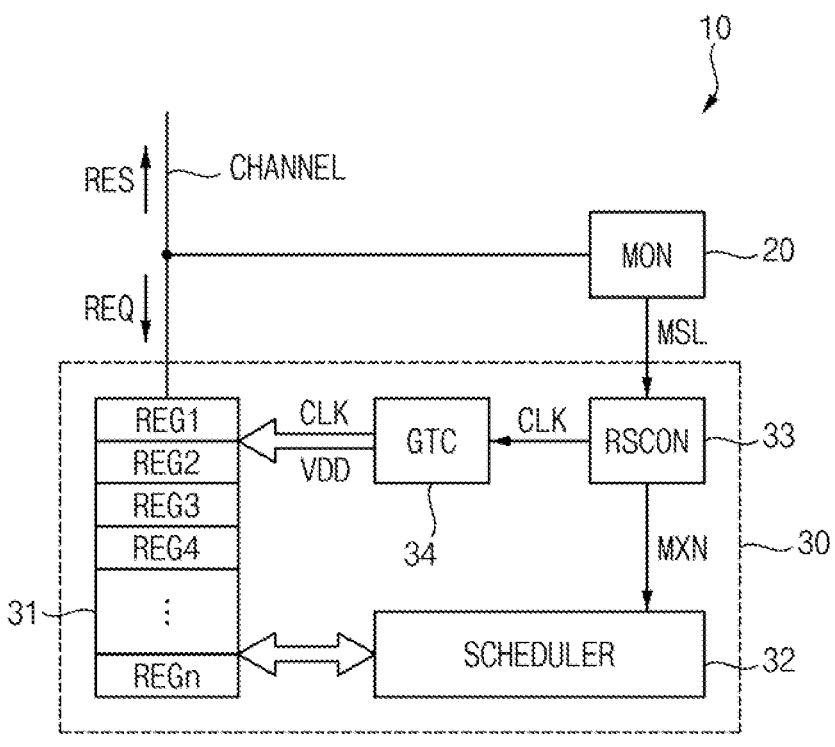
FIGS. 12A and 12B are diagrams of operation conditions in a method of controlling operation of a storage system according to example embodiments.
Figure 12B:
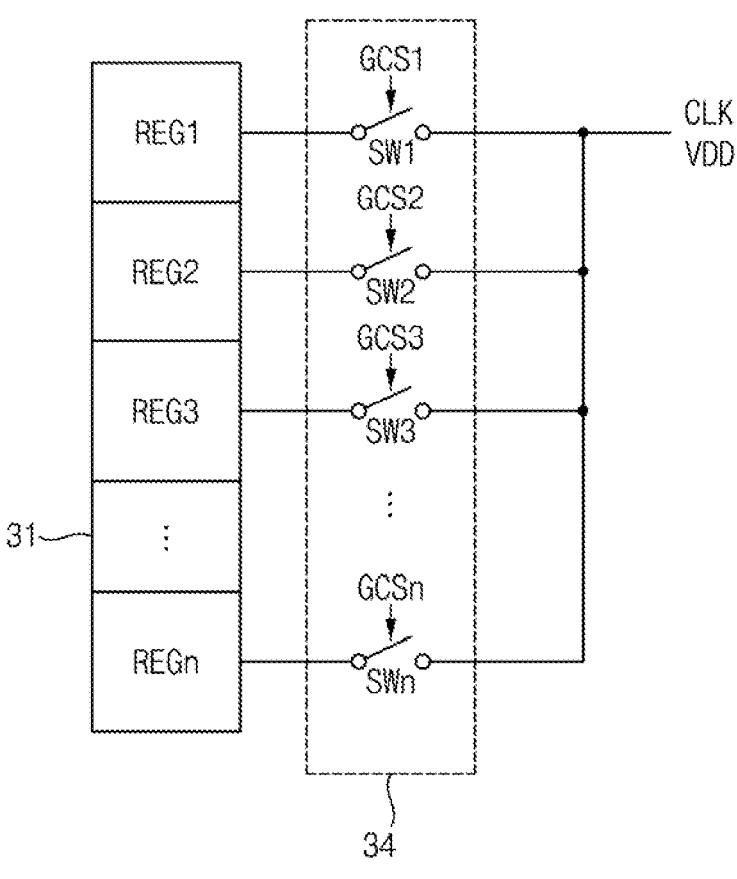

FIGS. 12A and 12B are diagrams of operation conditions in a method of controlling operation of a storage system according to example embodiments. In some example embodiments, the operation condition of the storage device may include a queue depth QDP indicating a maximum number of requests that is transferred from the host device and stored in a request queue of the storage device.

FIG. 12A illustrates a portion of a storage device according to example embodiments. Referring to FIG. 12A, a portion 10 of the storage device may include and a service level monitor MON 20 and a request control circuit 30.

The service level monitor 20 may provide a measured service level MSL by measuring a service level with respect to the requests transferred from the host device to the storage device. The request control circuit 30 may receive a requests REQ from the host device and transmit a response RSP to the request REQ to the host device through a channel connected to the interconnector.

The request control circuit 30 may include a request queue 31, a scheduler 32, a resource controller RSCON 33 and a gate circuit GTC 34.

The request queue 31 may include a plurality of request storage units REG1~REGn configured to store the requests, respectively. When a protocol supporting multiple outstanding transactions or multiple outstanding requests is adopted, the host device may include at least one request queue to store multiple requests.

The scheduler 32 may determine a service order of the requests stored in the request queue 31 based on respective priorities of the requests. According to the determined order, the storage device may sequentially perform operations corresponding to the stored requests.

The resource controller 33 may determine a maximum number MXN of outstanding requests that the request queue 31 may store. In some example embodiments, the resource controller 33 may generate a gate control signals GCS based on the maximum number MXN. The gate control signal GCS may include a plurality of switch control signals GCS1~GCSn as will be described below with reference to FIG. 12B. The maximum number MXN of the outstanding requests may be provided to the scheduler 32, and the scheduler 32 may control the storage and the execution order of the requests corresponding to the maximum number MXN.

The gate circuit 34 may control an operation clock signal CLK and a power supply voltage VDD provided to the plurality of the request storage units REG1~REGn, respectively, based on the gate control signal GCS.

FIG. 12B illustrates an example embodiment of controlling the operation condition.

Referring to FIG. 12B, the gate circuit 34 may include a plurality of switches SW1~SWn configured to gate an operation clock signal CLK and a power supply voltage VDD provided to a plurality of request storage units REG1~REGn included in a request queue 31, respectively.

Referring to FIGS. 12A and 12B, the resource controller 33 may generate a plurality of switch control signals GCS1~GCSn to control switching operations of the plurality of switches SW1~SWn, respectively. The plurality of switches SW1~SWn may be turned on or off in response to activation or deactivation of a corresponding one of the plurality of switch control signals GCS1~GCSn.

The resource controller 33 may change a number of activated switch control signals among the plurality of switch control signals GCS1~GCSn based on the measured service level MSL provided from the service level monitor 20.

When each switch control signal GCSi (i=1~n) is activated, the corresponding switch SWi may be turned on to transfer the operation clock signal CLK and the power supply voltage VDD to the corresponding request storage unit REGi and thus the corresponding request storage unit REGi may be enabled. In contrast, when each switch control signal GCSi is deactivated, the corresponding switch SWi may be turned off to block the operation clock signal CLK and the power supply voltage VDD to the corresponding request storage unit REGi and thus the corresponding request storage unit REGi may be disabled.

The resource controller 33 may, as the measured service level MSL increases, decrease a number of the switch control signals that are activated such that a number of the request storage units receiving the operation clock signal CLK and the power supply voltage VDD may be decreased. In other words, as the measured service level MSL increases, a number of the enabled request storage units among the plurality of request storage units REG1~REGn may be decreased. As a result, the maximum number MXN of the outstanding requests may be decreased as the measured service level MSL increases.

In this way, the performance and the power consumption of the storage device may be optimized by optimizing the maximum number of outstanding requests (MXN) or the maximum number of requests stored in the request queue 31.

In some example embodiments, the scheduler 32 may increase the priority of read requests (or commands) in the above-described read optimized mode, and increase the priority of write requests in the above-described write optimized mode. Accordingly, the read operation performance may be relatively improved in the read optimized mode, and the write operation performance may be relatively improved in the write optimized mode.

In some example embodiments, the request control circuit 30 may include a read request queue exclusively storing only read requests and a write request queue exclusively storing only write requests. In this case, as described with reference to FIGS. 12A and 12B, the number of enabled request storage units for each of the read request queue and the write/read request queue may be controlled according to the selected operation mode.

In the read optimized mode, the number of enabled request storage units in the read request queue may be increased, and in the write optimized mode, the number of enabled request storage units in the write request queue may be increased. Accordingly, the read operation performance may be relatively improved in the read optimized mode, and the write operation performance may be relatively improved in the write optimized mode.

Figure 13:
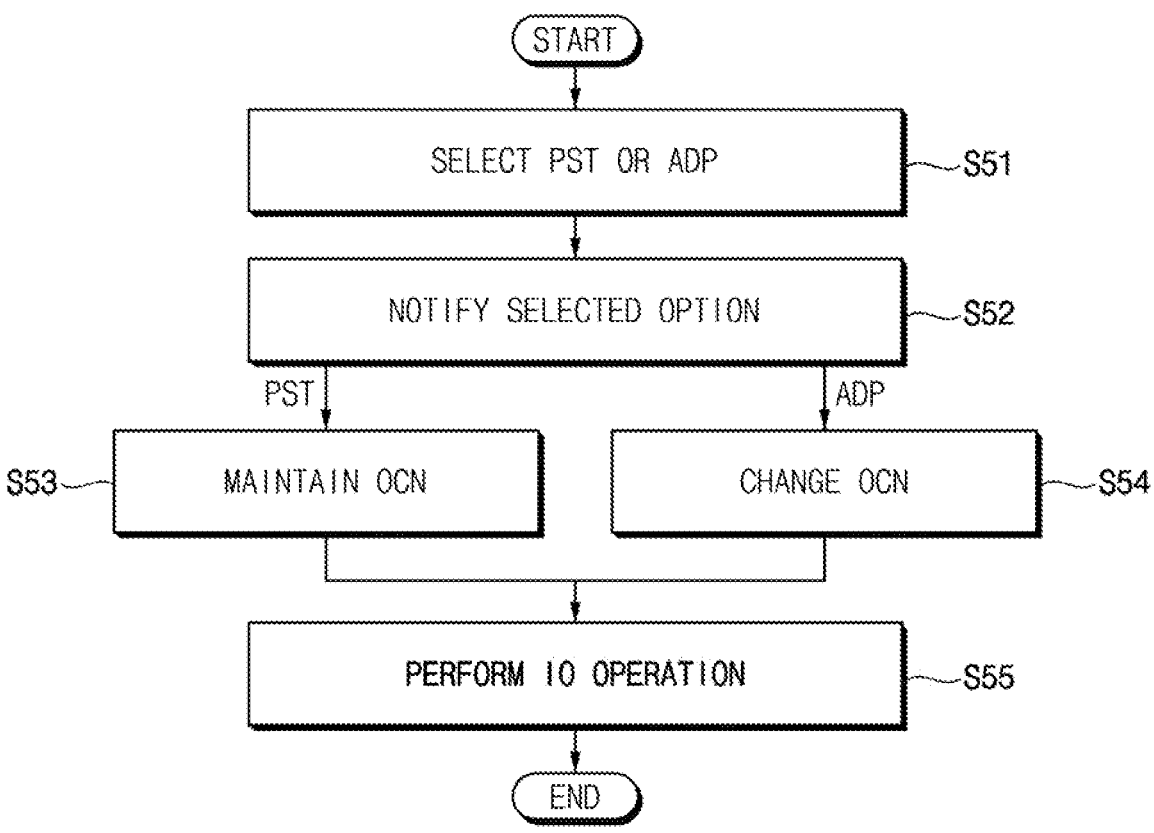
FIG. 13 is a flowchart of a method of controlling operation of a storage system according to example embodiments.

FIG. 13 is a flowchart of a method of controlling operation of a storage system according to example embodiments. Referring to FIGS. 1 and 13, the host device 200 may select the preset option PST or the adaptive option ADP as the selected option for the selected operation mode (S51). The host device 200 may notify the selected option to the storage device 301 (S52). When the selected option corresponds to the preset option PST, the storage device 301 may maintain the operation condition OCN corresponding to the selected operation mode (S53). Meanwhile, when the selected option corresponds to the adaptive option (DP, the storage device 301 may change the operation condition OCN corresponding to the selected operation mode (S54). The storage device 301 may perform an input-output (10) operation based on a fixed or variable operation condition OCN (S55).

Figure 14:
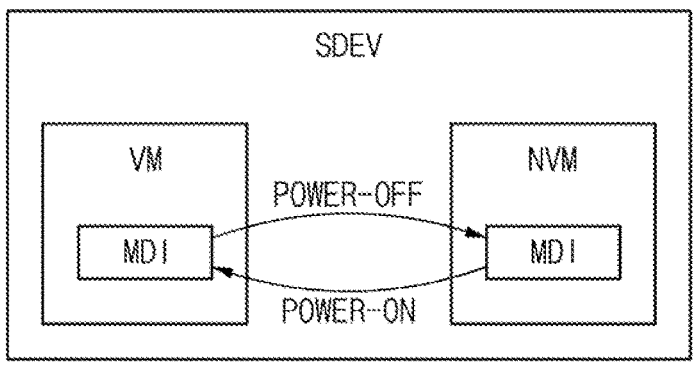
FIG. 14 is a diagram of a backup operation and a loading operation of a storage system according to example embodiments.

FIG. 14 is a diagram of a backup operation and a loading operation of a storage system according to example embodiments. Referring to FIG. 14, a storage device SDEV may include a nonvolatile memory device NVM and a volatile memory VM. In an implementation, the volatile memory VM may be the buffer memory 330 in FIG. 1.

The mode controller 315 in FIG. 1 may backup the mode information MDI from the volatile memory device VM to the nonvolatile memory device NVM when the first storage device 301 is powered off. In addition the mode controller 315 may load the mode information MDI from the nonvolatile memory device NVM to the volatile memory device VM when the first storage device 301 is powered on.

During the power-on state, the mode information MDI may be stored in the volatile memory device VM that has a relatively high operation speed for efficient update and management of information. The mode information MDI may be stored in the nonvolatile memory device NVM during the power-off state for consistency of information. As described with reference to FIG. 3, the mode information MDI may include information on the plurality of operation conditions OCN1~OCN5 respectively corresponding to the plurality of operation modes OMD1~OMD5 and information on the default operation mode DOMD.

Figure 15:
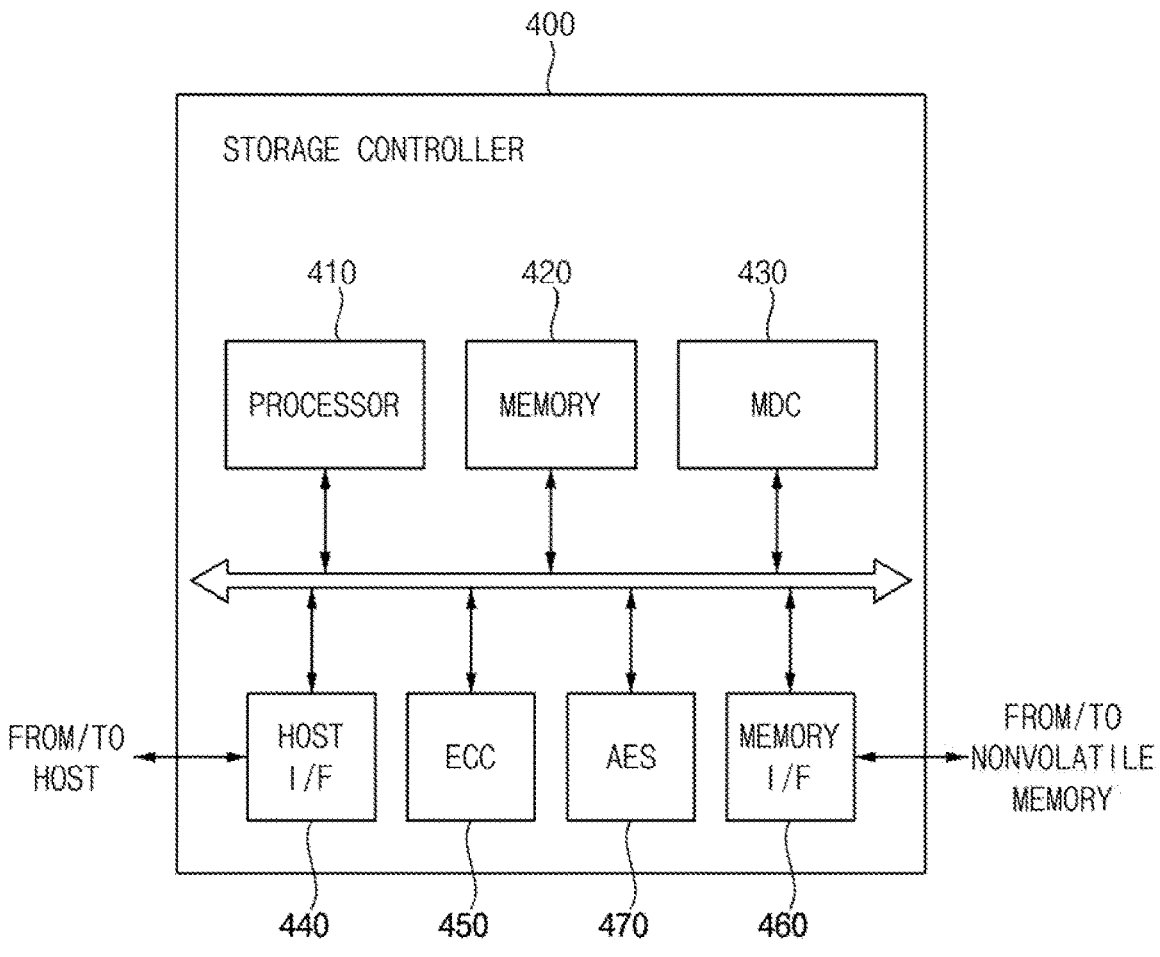
FIG. 15 is a block diagram of a storage controller included in a storage system according to example embodiments.

FIG. 15 is a block diagram of a storage controller included in a storage system according to example embodiments. Referring to FIG. 15, a storage controller 400 may include a processor 410, a memory 420, a mode controller 430, a host interface 440, an error correction code (ECC) engine 450, a memory interface 460 and an advanced encryption standard (AES) engine 470.

The processor 410 may control an operation of the storage controller 400 in response to a command received via the host interface 440 from a host device (e.g., the host device 200 in FIG. 1). In an implementation, the processor 410 may control an operation of a storage device (e.g., the first storage device 301 in FIG. 1), and may control respective components by employing firmware for operating the storage device.

The memory 420 may store instructions and data executed and processed by the processor 410. In an implementation, the memory 420 may be implemented with a volatile memory, such as a DRAM, a SRAM, or a cache memory.

As described above, the mode controller 430 may receive the notification of the selected operation mode from the host device and set the operation condition of the storage device to the selected operation condition corresponding to the selected operation mode. In addition, when the storage device receives the notification of the adaptive option, the mode controller 430 may change the selected operation condition by analyzing a pattern of commands transmitted from the host device when the selected option corresponds to the adaptive option.

The ECC engine 450 for error correction may perform coded modulation using a Bose-Chaudhuri-Hocquenghem (BCH) code, a low density parity check (LDPC) code, a turbo code, a Reed-Solomon code, a convolution code, a recursive systematic code (RSC), a trellis-coded modulation (TCM), or a block coded modulation (BCM), or may perform ECC encoding and ECC decoding using above-described codes or other error correction codes.

The host interface 440 may provide physical connections between the host device and the storage device. The host interface 440 may provide an interface corresponding to a bus format of the host device for communication between the host device and the storage device. In some example embodiments, the bus format of the host device may be a small computer system interface (SCSI) or a serial attached SCSI (SAS) interface. In other example embodiments, the bus format of the host device may be a USB, a peripheral component interconnect (PCI) express (PCIe), an advanced technology attachment (ATA), a parallel ATA (PATA), an SATA, or a nonvolatile memory express (NVMe), format.

The memory interface 460 may exchange data with a nonvolatile memory (e.g., the nonvolatile memories 320a, 320b and 320c in FIG. 1). The memory interface 460 may transfer data to the nonvolatile memory, or may receive data read from the nonvolatile memory. In some example embodiments, the memory interface 460 may be connected to the nonvolatile memory via one channel. In other example embodiments, the memory interface 460 may be connected to the nonvolatile memory via two or more channels. In an implementation, the memory interface 460 may be configured to comply with a standard protocol, such as Toggle or open NAND flash interface (ONFI).

The AES engine 470 may perform at least one of an encryption operation and a decryption operation on data input to the storage controller 400 using a symmetric-key algorithm. The AES engine 470 may include an encryption module and a decryption module. In an implementation, the encryption module and the decryption module may be implemented as separate modules. For another example, one module capable of performing both encryption and decryption operations may be implemented in the AES engine 470.

Figure 16:
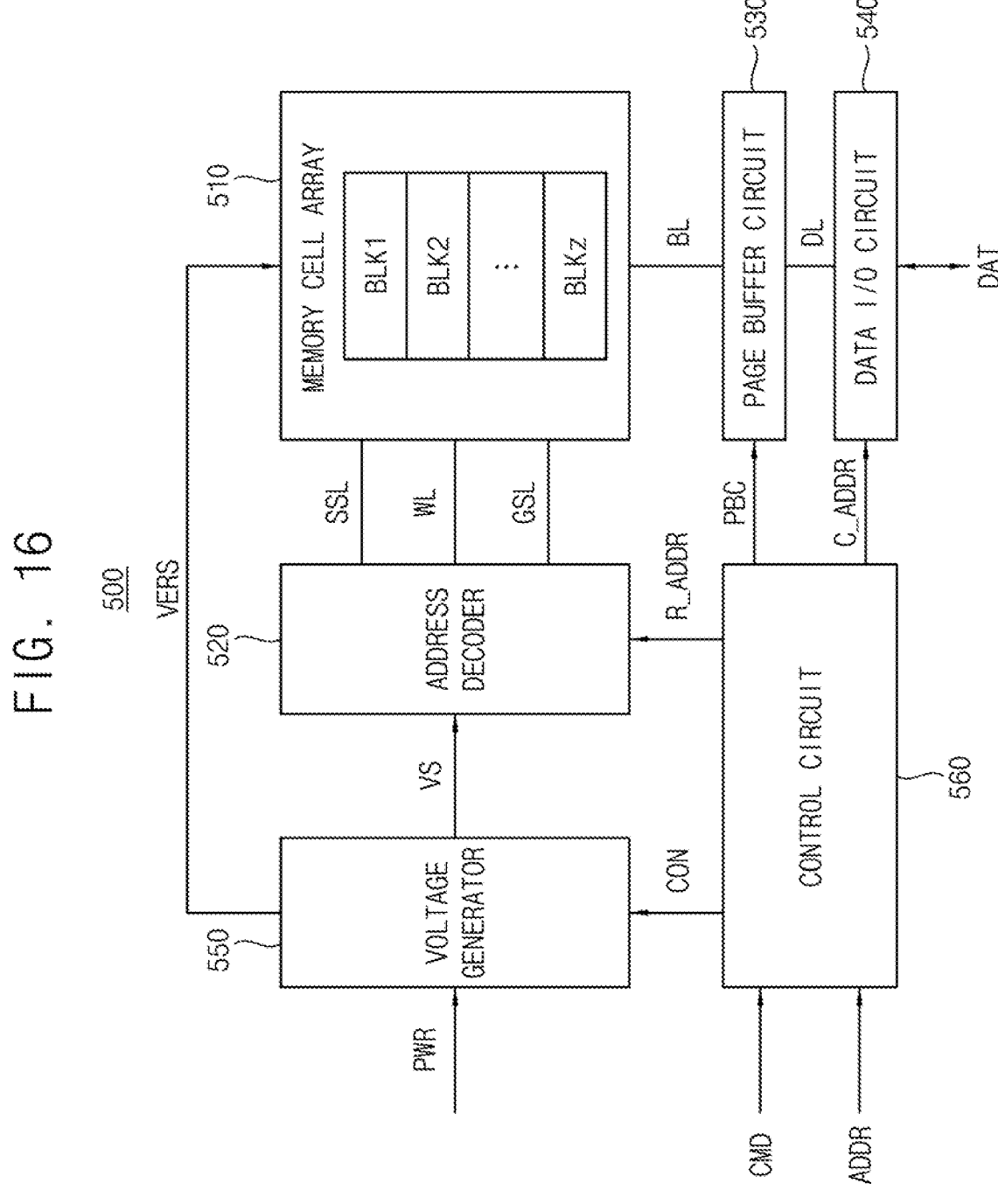
FIG. 16 is a block diagram of an example embodiment of a nonvolatile memory device included in a storage system according to example embodiments.

FIG. 16 is a block diagram of an example embodiment of a nonvolatile memory device included in a storage system according to example embodiments. Referring to FIG. 16, a nonvolatile memory 500 may include a memory cell array

510, an address decoder 520, a page buffer circuit 530, a data I/O circuit 540, a voltage generator 550 and a control circuit 560.

The memory cell array 510 may be connected to the address decoder 520 via a plurality of string selection lines SSL, a plurality of wordlines WL and a plurality of ground selection lines GSL. The memory cell array 510 may be further connected to the page buffer circuit 530 via a plurality of bitlines BL. The memory cell array 510 may include a plurality of memory cells (e.g., a plurality of nonvolatile memory cells) that are connected to the plurality of wordlines WL and the plurality of bitlines BL. The memory cell array 510 may be divided into a plurality of memory blocks BLK1, BLK2, . . . BLKz, each of which includes memory cells. In addition, each of the plurality of memory blocks BLK1, BLK2, BLKz may be divided into a plurality of pages.

In some example embodiments, the plurality of memory cells included in the memory cell array 510 may be arranged in a two-dimensional (2D) array structure or a three-dimensional (3D) vertical array structure. The memory cell array of the 3D vertical array structure will be described below with reference to FIG. 18.

The control circuit 560 receives a command CMD and an address ADDR from an outside (e.g., from the storage controller 310 in FIG. 1), and controls erasure, programming and read operations of the nonvolatile memory 500 based on the command CMD and the address ADDR. An erasure operation may include performing a sequence of erase loops, and a program operation may include performing a sequence of program loops. Each program loop may include a program operation and a program verification operation. Each erase loop may include an erase operation and an erase verification operation. The read operation may include a normal read operation and data recover read operation.

In an implementation, the control circuit 560 may generate control signals CON, which may be used for controlling the voltage generator 550, and may generate control signal PBC for controlling the page buffer circuit 530, based on the command CMD, and may generate a row address R_ADDR and a column address C ADDR based on the address ADDR. The control circuit 560 may provide the row address R_ADDR to the address decoder 520 and may provide the column address C ADDR to the data I/O circuit 540.

The address decoder 520 may be connected to the memory cell array 510 via the plurality of string selection lines SSL, the plurality of wordlines WL and the plurality of ground selection lines GSL.

In an implementation, in the data erase/write/read operations, the address decoder 520 may determine at least one of the plurality of wordlines WL as a selected wordline, and may determine the remaining wordlines, other than the selected wordline, as unselected wordlines, based on the row address R_ADDR.

In addition, in the data erase/write/read operations, the address decoder 520 may determine at least one of the plurality of string selection lines SSL as a selected string selection line, and may determine the remaining string selection lines, other than the selected string selection line, as unselected string selection lines, based on the row address R_ADDR.

Further, in the data erase/write/read operations, the address decoder 520 may determine at least one of the plurality of ground selection lines GSL as a selected ground selection line, and may determine the remaining ground selection lines, other than the selected ground selection line, as unselected ground selection lines, based on the row address R_ADDR.

The voltage generator 550 may generate voltages VS that may be required for an operation of the nonvolatile memory 500 based on a power PWR and the control signals CON. The voltages VS may be applied to the plurality of string selection lines SSL, the plurality of wordlines WL and the plurality of ground selection lines GSL via the address decoder 520. In addition, the voltage generator 550 may generate an erase voltage that may be required for the data erase operation based on the power PWR and the control signals CON. The erase voltage may be applied to the memory cell array 510 directly or via the bitline BL.

In an implementation, during the erase operation, the voltage generator 550 may apply the erase voltage to a common source line and/or the bitline BL of a memory block (e.g., a selected memory block) and may apply an erase permission voltage (e.g., a ground voltage) to all wordlines of the memory block or a portion of the wordlines via the address decoder 520. In addition, during the erase verification operation, the voltage generator 550 may apply an erase verification voltage simultaneously to all wordlines of the memory block or sequentially to the wordlines one by one.

In an implementation, during the program operation, the voltage generator 550 may apply a program voltage to the selected wordline and may apply a program pass voltage to the unselected wordlines via the address decoder 520. In addition, during the program verification operation, the voltage generator 550 may apply a program verification voltage to the selected wordline and may apply a verification pass voltage to the unselected wordlines via the address decoder 520.

In addition, during the normal read operation, the voltage generator 550 may apply a read voltage to the selected wordline and may apply a read pass voltage to the unselected wordlines via the address decoder 520. During the data recover read operation, the voltage generator 550 may apply the read voltage to a wordline adjacent to the selected wordline and may apply a recover read voltage to the selected wordline via the address decoder 520.

The page buffer circuit 530 may be connected to the memory cell array 510 via the plurality of bitlines BL. The page buffer circuit 530 may include a plurality of page buffers. In some example embodiments, each page buffer may be connected to one bitline. In other example embodiments, each page buffer may be connected to two or more bitlines.

The page buffer circuit 530 may store data DAT programmed into the memory cell array 510 or may read data DAT sensed (i.e., read) from the memory cell array 510. In other words, the page buffer circuit 530 may operate as a write driver or a sensing amplifier according to an operation mode of the nonvolatile memory 500.

The data I/O circuit 540 may be connected to the page buffer circuit 530 via data lines DL. The data I/O circuit 540 may provide the data DAT from the outside of the nonvolatile memory 500 to the memory cell array 510 via the page buffer circuit 530 or may provide the data DAT from the memory cell array 510 to the outside of the nonvolatile memory 500, based on the column address C ADDR.

Although the nonvolatile memory is described based on a NAND flash memory, the nonvolatile memory may be any nonvolatile memory, e.g., a phase random access memory (PRAM), a resistive random access memory (RRAM), a nano floating gate memory (NFGM), a polymer random access memory (PoRAM), a magnetic random access memory (MRAM), a ferroelectric random access memory (FRAM), or a thyristor random access memory (TRAM).

Figure 17:
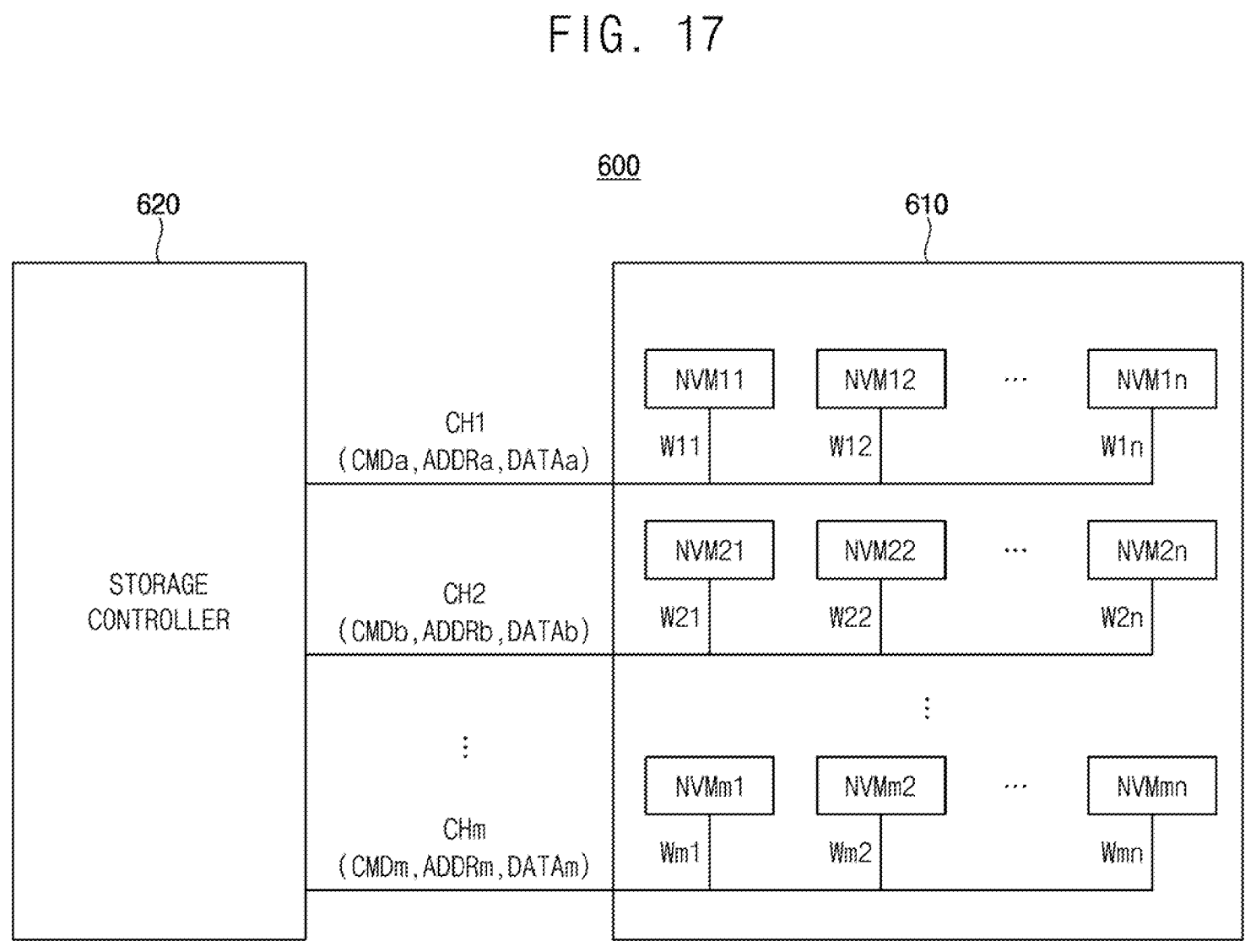

FIG. 17 is a block diagram of a storage device according to example embodiments. Referring to FIG. 17, a storage device 600 may include a memory device 610 and a memory controller 620. The storage device 600 may support a plurality of channels CH1, CH2, CHm, and the memory device 610 may be connected to the memory controller 620 through the plurality of channels CH1 to CHm. In an implementation, the storage device 600 may be implemented as a storage device, such as a universal flash storage (UFS), or a solid state drive (SSD).

The memory device 610 may include a plurality of nonvolatile memories NVM11, NVM12, . . . , NVM1n, NVM21, NVM22, NVM2n, NVMm1, NVMm2, . . . , NVMmn. In an implementation, the nonvolatile memories NVM11 to NVMmn may correspond to the nonvolatile memory device 320a, 320b and 320c in FIG. 1. Each of the nonvolatile memories NVM11 to NVMmn may be connected to one of the plurality of channels CH1 to CHm through a way corresponding thereto. For instance, the nonvolatile memories NVM11 to NVM1n may be connected to the first channel CH1 through ways W11, W12, . . . , Win, the nonvolatile memories NVM21 to NVM2n may be connected to the second channel CH2 through ways W21, W22, . . . , W2n, and the nonvolatile memories NVMm1 to NVMmn may be connected to the m-th channel CHm through ways Wm1, Wm2, Wmn. In some example embodiments, each of the nonvolatile memories NVM11 to NVMmn may be implemented as a memory unit that may operate according to an individual command from the memory controller 620. In an implementation, each of the nonvolatile memories NVM11 to NVMmn may be implemented as a chip or a die.

The memory controller 620 may transmit and receive signals to and from the memory device 610 through the plurality of channels CH1 to CHm. In an implementation, the memory controller 620 may correspond to the storage controller 310 in FIG. 1. In an implementation, the memory controller 620 may transmit commands CMDa, CMDb, . . . , CMDm, addresses ADDRa, ADDRb, ADDRm and data DATAa, DATAb, . . . , DATAm to the memory device 610 through the channels CH1 to CHm, or may receive the data DATAa to DATAm from the memory device 610 through the channels CH1 to CHm.

The memory controller 620 may select one of the nonvolatile memories NVM11 to NVMmn, which may be connected to each of the channels CH1 to CHm, using a corresponding one of the channels CH1 to CHm, and may transmit and receive signals to and from the selected nonvolatile memory. In an implementation, the memory controller 620 may select the nonvolatile memory NVM11 from among the nonvolatile memories NVM11 to NVM1n connected to the first channel CH1. The memory controller 620 may transmit the command CMDa, the address ADDRa and the data DATAa to the selected nonvolatile memory NVM11 through the first channel CH1 or may receive the data DATAa from the selected nonvolatile memory NVM11 through the first channel CH1. The memory controller 620 may transmit and receive signals to and from the memory device 610 in parallel through different channels. In an implementation, the memory controller 620 may transmit the command CMDb to the memory device 610 through the second channel CH2 while transmitting the command CMDa to the memory device 610 through the first channel CH1. In an implementation, the memory controller 620 may receive the data DATAb from the memory device 610 through the second channel CH2 while receiving the data DATAa from the memory device 610 through the first channel CH1.

The memory controller 620 may control overall operations of the memory device 610. The memory controller 620 may transmit a signal to the channels CH1 to CHm and may control each of the nonvolatile memories NVM11 to NVMmn connected to the channels CH1 to CHm. In an implementation, the memory controller 620 may transmit the command CMDa and the address ADDRa to the first channel CH1 and may control one selected from among the nonvolatile memories NVM11 to NVM1n.

Each of the nonvolatile memories NVM11 to NVMmn may operate under the control of the memory controller 620. In an implementation, the nonvolatile memory NVM11 may program the data DATAa based on the command CMDa, the address ADDRa and the data DATAa provided from the memory controller 620 through the first channel CH1. In an implementation, the nonvolatile memory NVM21 may read the data DATAb based on the command CMDb and the address ADDRb provided from the memory controller 620 through the second channel CH2 and may transmit the read data DATAb to the memory controller 620 through the second channel CH2.

FIG. 16 illustrates an example embodiment where the memory device 610 communicates with the memory controller 620 through m channels and includes n nonvolatile memories corresponding to each of the channels.

Figure 18:
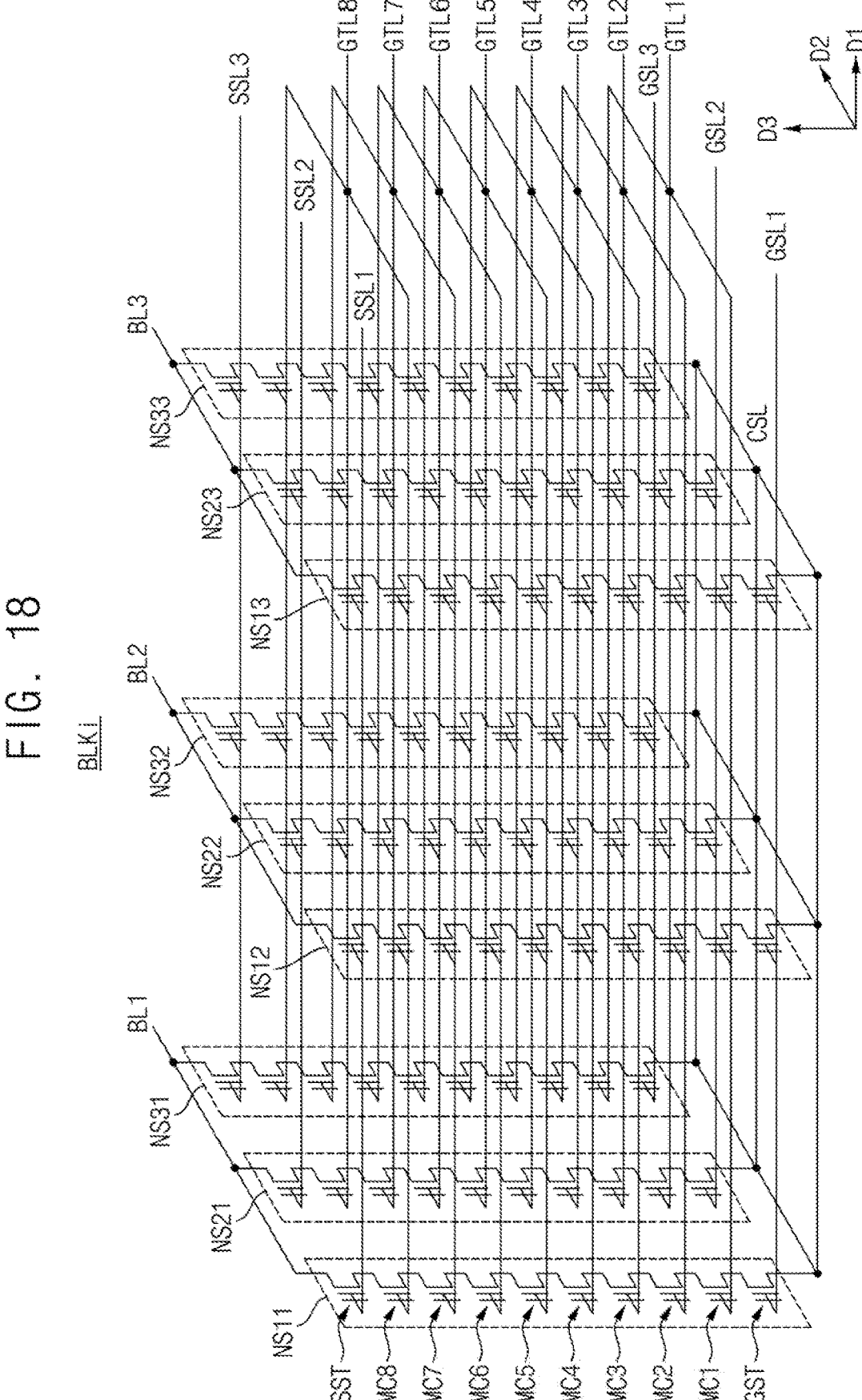
FIG. 18 is a circuit diagram of an equivalent circuit of a memory block included in a nonvolatile memory device according to example embodiments.

FIG. 18 is a circuit diagram of an equivalent circuit of a memory block included in a nonvolatile memory device according to example embodiments. Referring to FIG. 18, each memory block BLKi included in a memory cell array 510 in FIG. 16 may be formed on a substrate in a three-dimensional structure (or a vertical structure). In an implementation, NAND strings or cell strings included in the memory block BLKi may be formed in a vertical direction D3 perpendicular to an upper surface of a substrate. A first direction D1 and a second direction D2 may be parallel to the upper surface of the substrate.

The memory block BLKi may include NAND strings NS11 to NS33 coupled between bitlines BL1, BL2, and BL3 and a common source line CSL. Each of the NAND strings NS11 to NS33 may include a string selection transistor SST, a memory cells MC1 to MC8, and a ground selection transistor GST. In FIG. 18, each of the NAND strings NS11 to NS33 is illustrated to include eight memory cells MC1 to MC8. Each string selection transistor SST may be connected to a corresponding string selection line (one of SSL1 to SSL3). The memory cells MC1 to MC8 may be connected to corresponding gate lines GTL1 to GTL8, respectively. The gate lines GTL1 to GTL8 may be wordlines, and some of the gate lines GTL1 to GTL8 may be dummy wordlines. Each ground selection transistor GST may be connected to a corresponding ground selection line (one of GSL1 to GSL3). Each string selection transistor SST may be connected to a corresponding bitline (e.g., one of BL1, BL2, and BL3), and each ground selection transistor GST may be connected to the common source line CSL.

Wordlines (e.g., WL1) having the same height may be commonly connected, and the ground selection lines GSL1 to GSL3 and the string selection lines SSL1 to SSL3 may be separated. In FIG. 18, the memory block BLKi is illustrated as being coupled to eight gate lines GTL1 to GTL8 and three bitlines BL1 to BL3.

Figure 19:
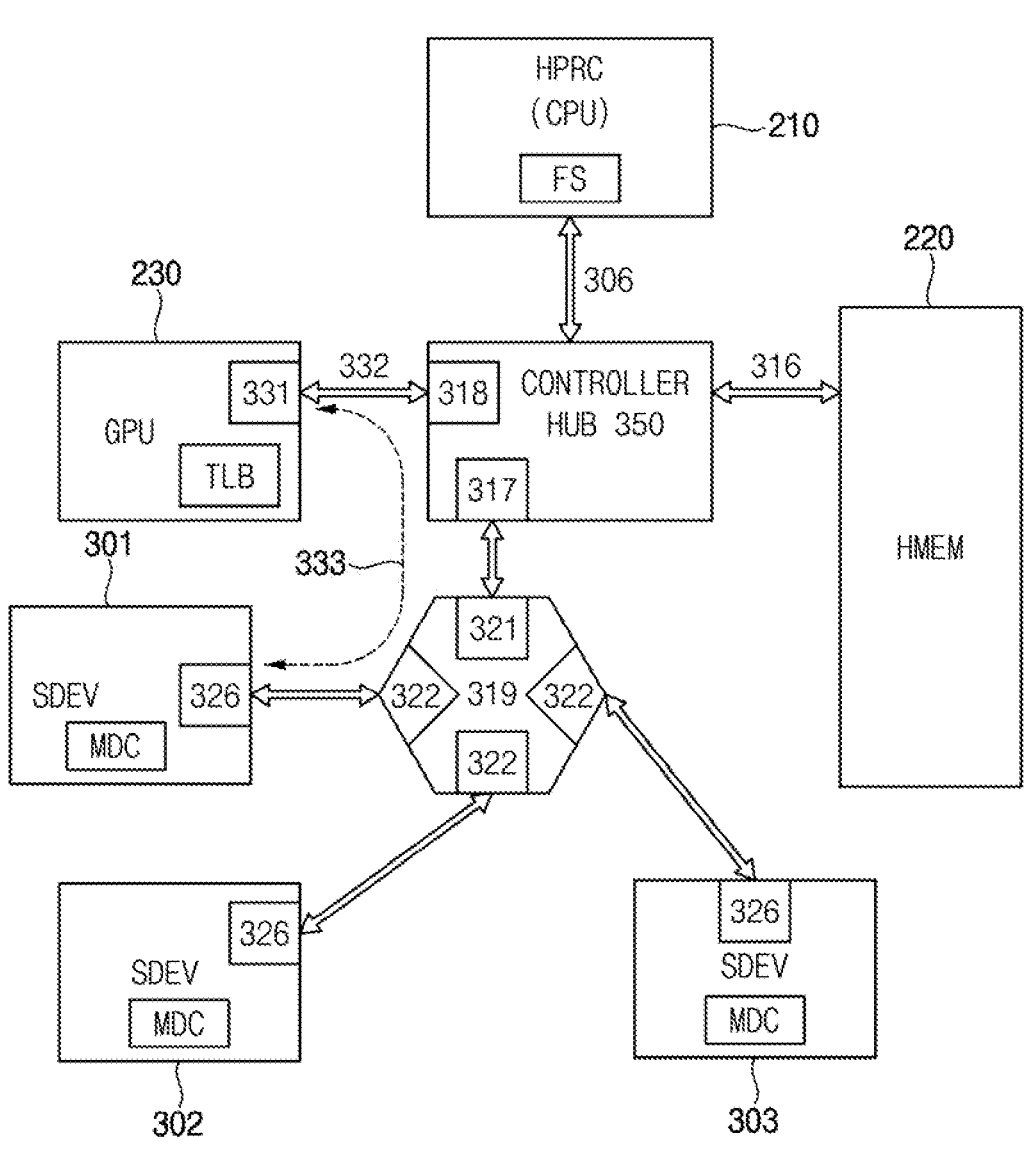
FIG. 19 is a block diagram of an interconnect architecture of a storage system according to example embodiments.

FIG. 19 is a block diagram of an example embodiment of an interconnect architecture of a storage system according to example embodiments. Referring to FIG. 19, an example embodiment of a design composed of point-to-point links that interconnect a set of components is illustrated. A storage system 102 may include a central processing unit (CPU) 210, a host memory device (or a system memory) HMEM 220 and a graphics processing unit (GPU) 230 coupled to a controller hub 350. The CPU 210 may correspond to the host processor HPRC in FIG. 1. The CPU 210 may be coupled to the controller hub 350 through a front-side bus (FSB) 306. In one example embodiment, the FSB 306 may be a serial point-to-point interconnect. In another example embodiment, the FSB 306 may include a serial, differential interconnect architecture that is compliant with a different interconnect standard.

The system memory 220 may include any memory device, such as random access memory (RAM), non-volatile (NV) memory, solid state memory, or other memory accessible by devices in the storage system 102. The system memory 220 may be coupled to the controller hub 350 through a memory interface 316. Examples of a memory interface include a double-data rate (DDR) memory interface, a dual-channel DDR memory interface, and a dynamic RAM (DRAM) memory interface.

In one example embodiment, the controller hub 350 may be a root hub, root complex, or root controller in a Peripheral Component Interconnect Express (PCIe or PCIE) interconnection hierarchy. Examples of the controller hub 350 include a chipset, a memory controller hub (MCH), a northbridge, an interconnect controller hub (ICH) a southbridge, and a root controller/hub. Often the term chipset refers to two physically separate controller hubs, e.g., a memory controller hub (MCH) coupled to an interconnect controller hub (ICH). Note that current systems often include the MCH integrated with the host processor 210, while the controller hub 350 may be used to communicate with I/O devices, in a similar manner as described below. In some example embodiments, peer-to-peer routing is optionally supported through the root complex or the controller hub 350.

Here, the controller hub 350 may be coupled to a switch/bridge 319 through a serial link. Input/output modules 317 and 321, which may also be referred to as interfaces/ports 317 and 321, include/implement a layered protocol stack to provide communication between the controller hub 350 and the switch 319. In one example embodiment, multiple devices such as storage devices 301, 302 and 303 may be capable of being coupled to the switch 319. The controller hub 350 and the switch 319 may be included in the interconnector 50 in FIG. 1.

The switch/bridge 319 may route packets/messages from storage devices 301, 302 and 303 upstream, e.g., up a hierarchy towards a root complex, to the controller hub 350 and downstream, e.g., down a hierarchy away from a root controller, from the processor 210 or the system memory 220 to the storage devices 301, 302 and 303. The switch 319, in one example embodiment, is referred to as a logical assembly of multiple virtual PCI-to-PCI bridge devices. The storage devices 301, 302 and 303 include any internal or external device or component coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such a device, is referred to as an endpoint. The storage devices 301, 302 and 303 may include a PCIe to PCI/PCI-X bridge to support legacy or other version PCI devices. Endpoint devices in PCIe are often classified as legacy, PCIe, or root complex integrated endpoints.

The GPU 230 may be also coupled to the controller hub 350 through a serial link 332. The I/O modules 331 and 318 may be used to implement a layered protocol stack to communicate between the GPU 230 and the controller hub 350.

The GPU 230 may form a direct communication channel 333 with at least one storage device (e.g., the first storage device 301) through an interconnector under the control of the CPU 210. The GPU 230 may perform input-output operations with the storage device 301 independently of the CPU 210 through the direct communication channel 333.

In the case of direct storage forming a direct communication channel 333 with the GPU 230 like the first storage device 301 of FIG. 19 in a gaming environment, there has been on scheme to support the intensive random read. According to example embodiments, the faster read response may be implemented by turning on and off the gaming mode and changing the cache policy through read pattern analysis in a situation where the workload of the gaming environment is expected.

As described above, in addition to the gaming mode, various operation modes such as the normal mode, the read optimized mode, the write optimized mode, and the power saving mode may be automatically set using commands provided from the host device.

Figure 20:
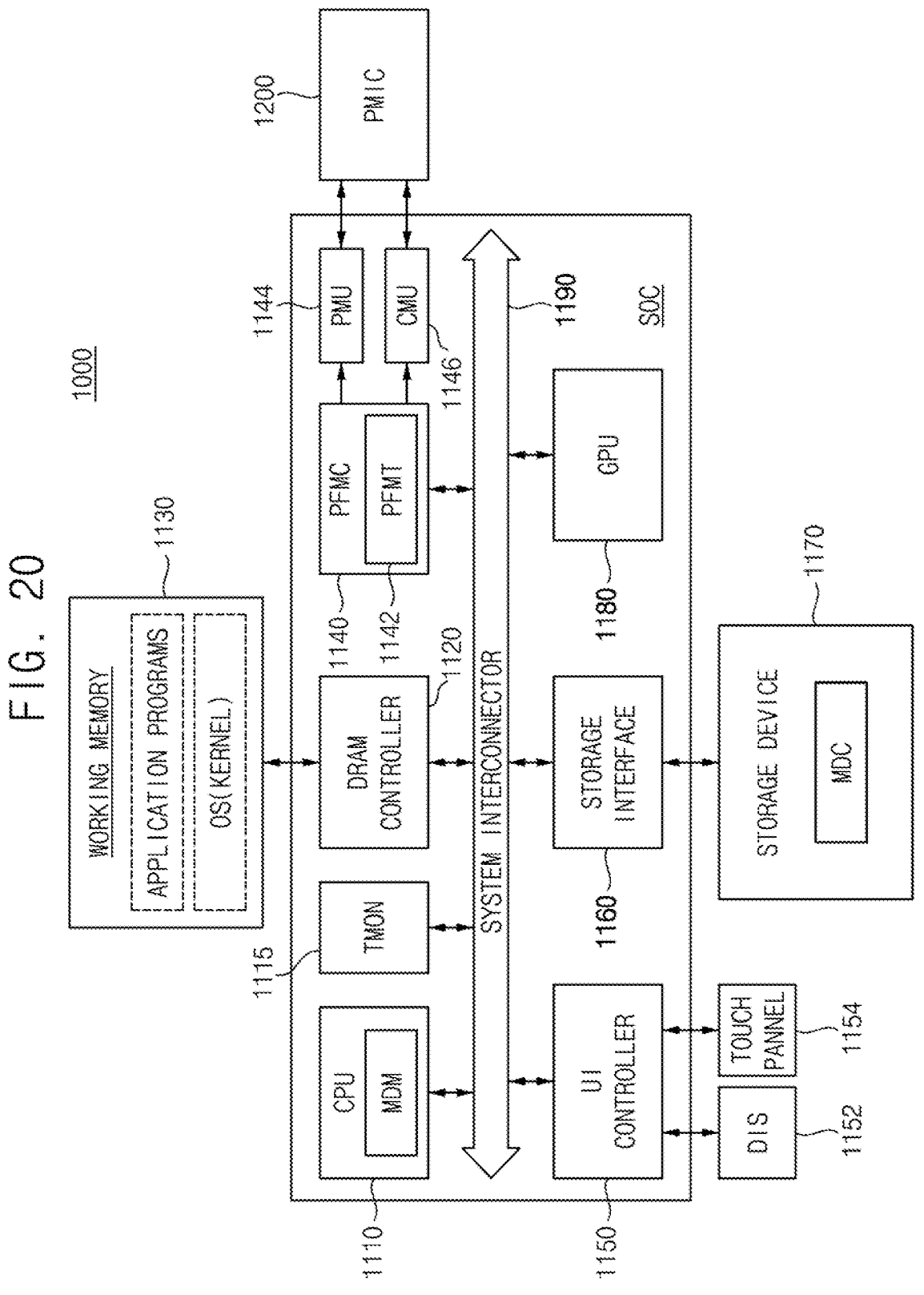
FIG. 20 is a block diagram of a multi-core system according to example embodiments.

FIG. 20 is a block diagram of a multi-core system according to example embodiments. Referring to FIG. 20, a multi-core system 1000 may include a system on chip (SoC), a working memory 1130, a display device (DIS) 1152, a touch panel 1154, a storage device 1170, or a power management integrated circuit (PMIC) 1200. The SoC may include a central processing unit (CPU) 1110, a task monitor circuit TMON 1115, a DRAM controller 1120, a performance controller 1140, a user interface controller (UI controller) 1150, a storage interface 1160, and an accelerator 1180 such as a GPU, a power management unit (PMU) 1144, or a clock management unit (CMU) 1146. The multi-core system 1000 may further include a hardware codec for processing image data, or a security block.

The CPU 1110 executes software (e.g., an application program, an operating system (OS), and device drivers) for the multi-core system 1000. The CPU 1110 may execute the operating system (OS) which may be loaded into the working memory 1130. The CPU 1110 may execute various application programs driven on the operating system (OS). In some example embodiments, the above-described mode manager MDM may be implemented as software program executed by the CPU 1110. The CPU 1110 may be provided as a homogeneous multi-core processor or a heterogeneous multi-core processor. A multi-core processor may be a computing component including at least two independently drivable processors (hereinafter referred to as "cores" or "processor cores"). Each of the cores may independently read and execute program instructions.

The processor cores of the CPU 1110 may be grouped into a plurality of clusters that operate with an independent driving clock and an independent driving voltage. The processor cores in the same cluster may be included in a clock domain operating based on the same clock signal and/or in a power domain operating based on the same driving voltage. The driving voltage and/or the clock signal provided to each of the processor cores may be cut off or connected in units of single cores.

A kernel of the operating system (OS) may monitor the number of tasks in a task queue and the driving voltage and the driving clock of the CPU 1110 at specific time intervals to control the CPU 1110. In addition, a kernel of the operating system (OS) may control hotplug-in or hotplug-out of the CPU 1110 with reference to the monitored information.

The DRAM controller 1120 provides interfacing between the working memory 1130 and the system-on-chip (SoC). The DRAM controller 1120 may access the working memory 1130 according to a request of the CPU 1110 or another intellectual property (IP) block.

The operating system (OS) or basic application programs may be loaded into the working memory 1130 during a booting operation. In an implementation, an OS image stored in the storage device 1170 may be loaded into the working memory 1130 based on a booting sequence during booting of the multi-core system 1000. Overall input/output operations of the multi-core system 1000 may be supported by the operating system (OS). The working memory 1130 may be a volatile memory such as a static random access memory (SRAM) and a dynamic random access memory (DRAM) or a nonvolatile memory device such as a phase-change random-access memory (PRAM), a magnetoresistive random-access memory (MRAM), a resistive random-access memory (ReRAM), a ferroelectric random-access memory (FRAM), and a NOR flash memory.

The performance controller 1140 may adjust operation parameters of the system-on-chip (SoC) according to a control request provided from the kernel of the operating system (OS). In an implementation, the performance controller 1140 may adjust the level of DVFS to enhance performance of the system-on-chip (SoC). Alternatively, the performance controller 1140 may generate the frequency selection signals to control the frequencies of the processor cores according to a request of the kernel. In this case, the performance controller 1140 may include a performance table PFMT 1142 to set a driving voltage and a frequency of a driving clock therein. The performance controller 1140 may control the PMU 1144 and the CMU 1146, which together form a power managing circuit, connected to the PMIC 1200 to provide the determined driving voltage and the determined driving clock to each power domain.

The user interface controller 1150 controls user input and output from user interface devices. In an implementation, the user interface controller 1150 may display a keyboard screen for inputting data to the LCD 1152 according to the control of the CPU 1110. Alternatively, the user interface controller 1150 may control the LCD 1152 to display data that a user requests. The user interface controller 1150 may decode data provided from user input means, such as a touch panel 1154, into user input data.

The storage interface 1160 accesses the storage device 1170 according to a request of the CPU 1110. In an implementation, the storage interface 1160 provides interfacing between the system-on-chip (SoC) and the storage device 1170. In an implementation, data processed by the CPU 1110 may be stored in the storage device 1170 through the storage interface 1160. Alternatively, data stored in the storage device 1170 may be provided to the CPU 1110 through the storage interface 1160.

The storage device 1170 may be provided as a storage medium of the multi-core system 1000. The storage device 1170 may store application programs, an OS image, and various types of data. The storage device 170 may be provided as a memory card (e.g., MMC, eMMC, SD, or MicroSD). The storage device 170 may include a NAND-type flash memory with high-capacity storage capability. Alternatively, the storage device 1170 may include a next-generation nonvolatile memory such as PRAM, MRAM, ReRAM, and FRAM or a NOR-type flash memory.

The accelerator 1180 may be provided as a separate intellectual property (IP) component to increase processing speed of a multimedia or multimedia data. In an implementation, the accelerator 1180 may be provided as an intellectual property (IP) component to enhance processing performance of a text, audio, still images, animation, video, two-dimensional data or three-dimensional data.

A system interconnector 1190 may be a system bus to provide an on-chip network in the system-on-chip (SoC). The system interconnector 1190 may include, e.g., a data bus, an address bus, and a control bus. The data bus may be a data transfer path. A memory access path to the working memory 1130 or the storage device 1170 may also be provided. The address bus provides an address exchange path between intellectual properties (IPs). The control bus may provide a path along which a control signal is transmitted between intellectual properties (IPs).

As described above, the mode manager MDM, which may be executed in the kernel of the OS by the CPU 1110, may determine the selected operation mode from among the plurality of operation modes of the storage device 1170 based on monitoring of the input-output type of the storage device 1170 or based on the user's input. The mode controller MDC of the storage device 1170 may receive the notification of the selected operation mode from the SoC corresponding to the host device and set the operation condition of the storage device 1170 to the selected operation condition corresponding to the selected operation mode. In addition, when the storage device 1170 receives the notification of the adaptive option, the mode controller MDC may change the selected operation condition by analyzing a pattern of commands transmitted from the SoC when the selected option corresponds to the adaptive option.

As will be appreciated by one skilled in the art, example embodiments may be embodied as a system, method, computer program product, or a computer program product embodied in one or more computer readable medium(s) having computer readable program code embodied thereon. The computer readable program code may be provided to a processor of a general purpose computer, special purpose computer, or other programmable data processing apparatus. The computer readable medium may be a computer readable signal medium or a computer readable storage medium. The computer readable storage medium may be any tangible medium that can contain, or store a program for use by or in connection with an instruction execution system, apparatus, or device.

Systems may be incorporated including a memory card, a solid state drive (SSD), an embedded multimedia card (eMMC), a universal flash storage (UFS), a mobile phone, a smart phone, a personal digital assistant (PDA), a portable multimedia player (PMP), a digital camera, a camcorder, a personal computer (PC), a server computer, a workstation, a laptop computer, a digital TV, a set-top box, a portable game console, a navigation system, a wearable device, an internet of things (IoT) device, an internet of everything (IoE) device, an e-book, a virtual reality (VR) device, an augmented reality (AR) device, a server system, or an automotive driving system.

An input-output type of the storage device or an operation pattern of the storage system may vary according to the type of storage system including the storage device and the user who uses the storage system. If the storage device does not meet the performance requirements of the system, the performance of the entire system deteriorates. On the other hand, if the operating speed of the storage device is excessively increased beyond the level required by the system, power consumption of the storage device and a system including the storage device may unnecessarily increase.

By way of summation and review, storage devices have advantages in that they have excellent stability and durability because they do not have a mechanical moving part, and that information access speed is very fast and power consumption is low. As electronic circuits are applied to various types of systems such as automobiles, airplanes, and drones as well as electronic systems such as notebook computers, storage devices are also used in various types of systems.

Some example embodiments may provide a storage device, a storage system including a storage device and a method of controlling operation of a storage system, capable of efficiently optimizing a storage device.

The storage system and the method of controlling operation of the storage system according to example embodiments may enhance performance of the storage device and the storage system by selecting the operation mode corresponding to the operation pattern of the storage system to optimize the operation conditions of the storage device.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A method of controlling operation of a storage system including a storage device and a host device configured to control the storage device, the method comprising:
    determining, by the host device, a selected operation mode from among a plurality of operation modes of the storage device;
    determining, by the host device, one of a preset option to fix an operation condition and an adaptive option to change the operation condition as a selected option corresponding to the selected operation mode;
    notifying, by the host device, the selected operation mode and the selected option to the storage device;
    setting, by the storage device, the fixed operation condition or the changed operation condition of the storage device to a selected operation condition corresponding to the selected operation mode; and
    performing, by the storage device, an input-output operation with the host device based on the selected operation condition,
    wherein each of the plurality of operation modes includes the preset option and the adaptive option, and
    wherein the operation condition includes at least one of a size of a cache memory of a buffer memory included in the storage device or a queue depth indicating a maximum number of requests that is transferred from the host device and stored in a request queue included in the storage device.

2. The method as claimed in claim 1, wherein determining the selected operation mode includes:
    providing, by the host device, a graphical user interface;
    receiving, by the host device, a user's input through the graphic user interface; and
    determining, by the host device, the selected operation mode based on the user's input.

3. The method as claimed in claim 1, wherein notifying the selected operation mode to the storage device includes transmitting, by the host device, a command including a mode identifier indicating the selected operation mode to the storage device.

4. The method as claimed in claim 1, further comprising notifying, by the storage device, that entry into the selected operation mode is completed after setting the operation condition of the storage device to the selected operation condition.

5. The method as claimed in claim 4, further comprising stopping, by the storage device, the input-output operation until the storage device notifies the host device that the entry into the selected operation mode is completed.

6. The method as claimed in claim 1, wherein the selected operation mode is changed by the host device while the storage device operates.

7. The method as claimed in claim 1, further comprising:
    determining, by the host device, a default operation mode from among the plurality of operation modes; and
    notifying, by the host device, the default operation mode to the storage device.

8. The method as claimed in claim 7, further comprising:
    storing, by the storage device, mode information including the default operation mode in a nonvolatile memory device included in the storage device, when the storage device is powered off, and
    setting, by the storage device, the default operation mode as the selected operation mode based on the mode information stored in the nonvolatile memory device, when the storage device is powered on.

9. The method as claimed in claim 1, further comprising changing, by the storage device, the selected operation condition by analyzing a pattern of commands transmitted from the host device when the selected option corresponds to the adaptive option.

10. The method as claimed in claim 9, further comprising:
    storing, by the storage device, mode information including the selected operation condition that is changed by the storage device in a nonvolatile memory device included in the storage device, when the storage device is powered off; and
    setting, by the storage device, the operation condition of the storage device based on the mode information stored in the nonvolatile memory device, when the storage device is powered on.

11. The method as claimed in claim 1, wherein the determining of the selected option includes:
    providing, by the host device, a graphical user interface;
    receiving, by the host device, a user's input through the graphic user interface; and
    determining, by the host device, the selected option based on the user's input.

12. The method as claimed in claim 1, wherein the plurality of operation modes include:
    a normal mode corresponding to the selected operation condition to have a first performance of each of read and write operations, a read optimized mode corresponding to the selected operation condition to improve the first performance of the read operation, and a write optimized mode corresponding to the selected operation condition to improve the first performance of the write operation.

13. The method as claimed in claim 12, wherein the storage device increases a size of a read cache of a buffer memory included in the storage device configured to store data for the read operation in the read optimized mode and increases a size of a write cache of the buffer memory configured to store data for the write operation in the write optimized mode.

14. The method as claimed in claim 12, wherein the storage device increases priority of a read command in the read optimized mode and increases priority of a write command in the write optimized mode.

15. A storage system, comprising:

an interconnector;

a storage device connected to the interconnector and configured to store data; and a host device connected to the interconnector and configured to control operation of the storage device, wherein:

the host device is configured to:

determine a selected operation mode from among a plurality of operation modes of the storage device, and determine one of a preset option to fix an operation condition and an adaptive option to change the operation condition as a selected option corresponding to the selected operation mode, and notify the selected operation mode and the selected option to the storage device, the storage device is configured to:

set the fixed operation condition or the changed operation condition of the storage device to a selected operation condition corresponding to the selected operation mode, and perform an input-output operation with the host device based on the selected operation condition, each of the plurality of operation modes includes the preset option and the adaptive option, and the operation condition includes at least one of a size of a cache memory of a buffer memory included in the storage device or a queue depth indicating a maximum number of requests that is transferred from the host device and stored in a request queue included in the storage device.

16. The storage system as claimed in claim 15, wherein the storage system is configured such that:

the host device determines a default operation mode from among the plurality of operation modes and notifies the default operation mode to the storage device, and the storage device stores mode information including the default operation mode in a nonvolatile memory device included in the storage device, when the storage device is powered off and sets the default operation mode as the selected operation mode based on the mode information stored in the nonvolatile memory device, when the storage device is powered on.

17. The storage system as claimed in claim 15, wherein the storage system is configured such that:

the storage device varies the selected operation condition by analyzing a pattern of commands transmitted from the host device when the selected option corresponds to the adaptive option.

18. The storage system as claimed in claim 15, wherein:

the host device includes a central processing unit and a graphics processing unit, and the graphics processing unit is configured to form a direct communication channel with the storage device and perform the input-output operation with the storage device through the direct communication channel independently of the central processing unit.

19. A storage device, comprising:

a nonvolatile memory device configured to store data; and a storage controller configured to control the nonvolatile memory device, wherein:

the storage device is configured such that the storage controller;

sets an operation condition as a fixed operation condition of a preset option of the storage device or as a changed operation condition of an adaptive option of the storage device to a selected operation condition corresponding to a selected operation mode, and performs an input-output operation with a host device based on the selected operation condition, the selected operation mode being determined based on a command transferred from the host device, the selected operation mode includes the preset option and the adaptive option, and the operation condition includes at least one of a size of a cache memory of a buffer memory included in the storage device or a queue depth indicating a maximum number of requests that is transferred from the host device and stored in a request queue included in the storage device.

* * * * *